(12) United States Patent
Nakamura

(10) Patent No.: US 10,273,942 B2
(45) Date of Patent: Apr. 30, 2019

(54) ROTATION ASSISTANCE MECHANISM

(71) Applicant: Kazuhiko Nakamura, Yokohama (JP)

(72) Inventor: Kazuhiko Nakamura, Yokohama (JP)

( * ) Notice: Subject to any disclaimer, the term of this patent is extended or adjusted under 35 U.S.C. 154(b) by 16 days.

(21) Appl. No.: 15/723,179

(22) Filed: Oct. 3, 2017

(65) Prior Publication Data

US 2018/0038355 A1 Feb. 8, 2018

Related U.S. Application Data

(63) Continuation of application No. PCT/JP2017/008919, filed on Mar. 7, 2017.

(30) Foreign Application Priority Data

Mar. 9, 2016 (JP) .................................. 2016-045574

(51) Int. Cl.
*F03G 7/00* (2006.01)
*H02K 1/17* (2006.01)
(Continued)

(52) U.S. Cl.
CPC ............... *F03G 7/00* (2013.01); *F16H 49/00* (2013.01); *H02K 1/17* (2013.01); *H02K 53/00* (2013.01); *B62M 6/00* (2013.01)

(58) Field of Classification Search
CPC .. F03G 7/00; B62M 6/00; B62M 6/10; B62M 6/15; B62M 6/20; B62M 6/25;
(Continued)

(56) References Cited

U.S. PATENT DOCUMENTS 4,151,431 A * 4/1979 Johnson .................. H02K 53/00
310/12.07
2007/0145846 A1* 6/2007 Freixas Vila ........... F16H 61/24
310/152
(Continued)

FOREIGN PATENT DOCUMENTS

JP    S57-140961 A    8/1982
JP    S62-031364 A    2/1987
(Continued)

OTHER PUBLICATIONS

Hattori Makoto; Machida Hiroshi; Hirose Masahiko, Magnet Motor, Mar. 1999, Mitsubishi Heavy Ind Ltd, JP 11-089138 (English Machine Translation).*
(Continued)

*Primary Examiner* — Bernard Rojas
*Assistant Examiner* — Alexander A Singh
(74) *Attorney, Agent, or Firm* — Yokoi & Co., U.S.A.; Toshiyuki Yokoi

(57) ABSTRACT

A rotation assistance mechanism equipped with: a variable magnetic unit having a pair of magnetic members for which the opposite poles of the members are arranged facing one another; a magnetic drive unit that changes the distance between the pair of magnetic members with a predetermined period by the rotation of a rear wheel; a shield unit having a pair of magnetic surfaces the poles of which are the same as the pair of magnetic members; a shield drive unit that advances the shield unit to between the pair of magnetic members in predetermined cycles when the distance between the pair of magnetic members is contracted, and retracts the shield unit from between the pair of magnetic members in predetermined cycles when the distance between the pair of magnetic members is expanded.

4 Claims, 16 Drawing Sheets

(51) Int. Cl.
  *H02K 53/00* (2006.01)
  *F16H 49/00* (2006.01)
  *B62M 6/00* (2010.01)

(58) Field of Classification Search
  CPC . B62M 6/30; B62M 6/35; B62M 6/40; B62M 6/50; B62M 6/55; B62M 6/60; B62M 6/65; B62M 6/70; B62M 6/75; B62M 6/80; B62M 6/85; B62M 6/90; H02K 53/00; H02K 1/17
  USPC .................................................. 310/154.01
  See application file for complete search history.

(56) References Cited

U.S. PATENT DOCUMENTS

2015/0222149 A1\* 8/2015 Nakamura ................ F03G 7/10
                                                310/152
2016/0006335 A1   1/2016 Ohhashi et al.

FOREIGN PATENT DOCUMENTS

| JP | H09-123981 A | | 5/1997 |
|----|--------------|---|--------|
| JP | 11089138 A | \* | 3/1999 |
| JP | 5503092 B | | 5/2014 |
| WO | 2014/034570 A | | 3/2014 |
| WO | 2014/109268 A | | 7/2014 |

OTHER PUBLICATIONS

International Search Report for PCT/JP2017/008919 dated Jun. 13, 2017.
Japanese decision to grant a patent dated Feb. 21, 2017.
Japanese notification of reasons for refusal dated Nov. 8, 2016.

\* cited by examiner

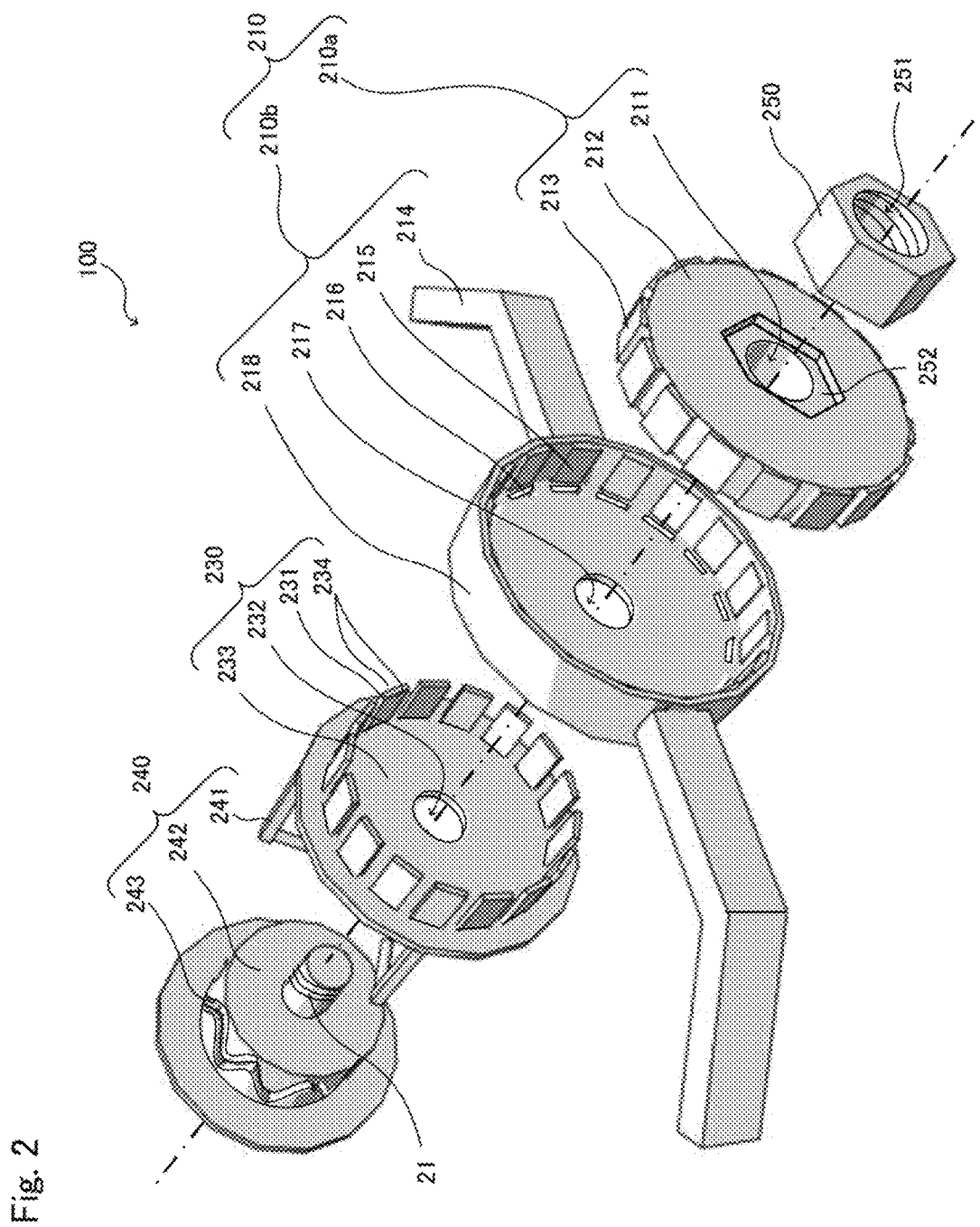

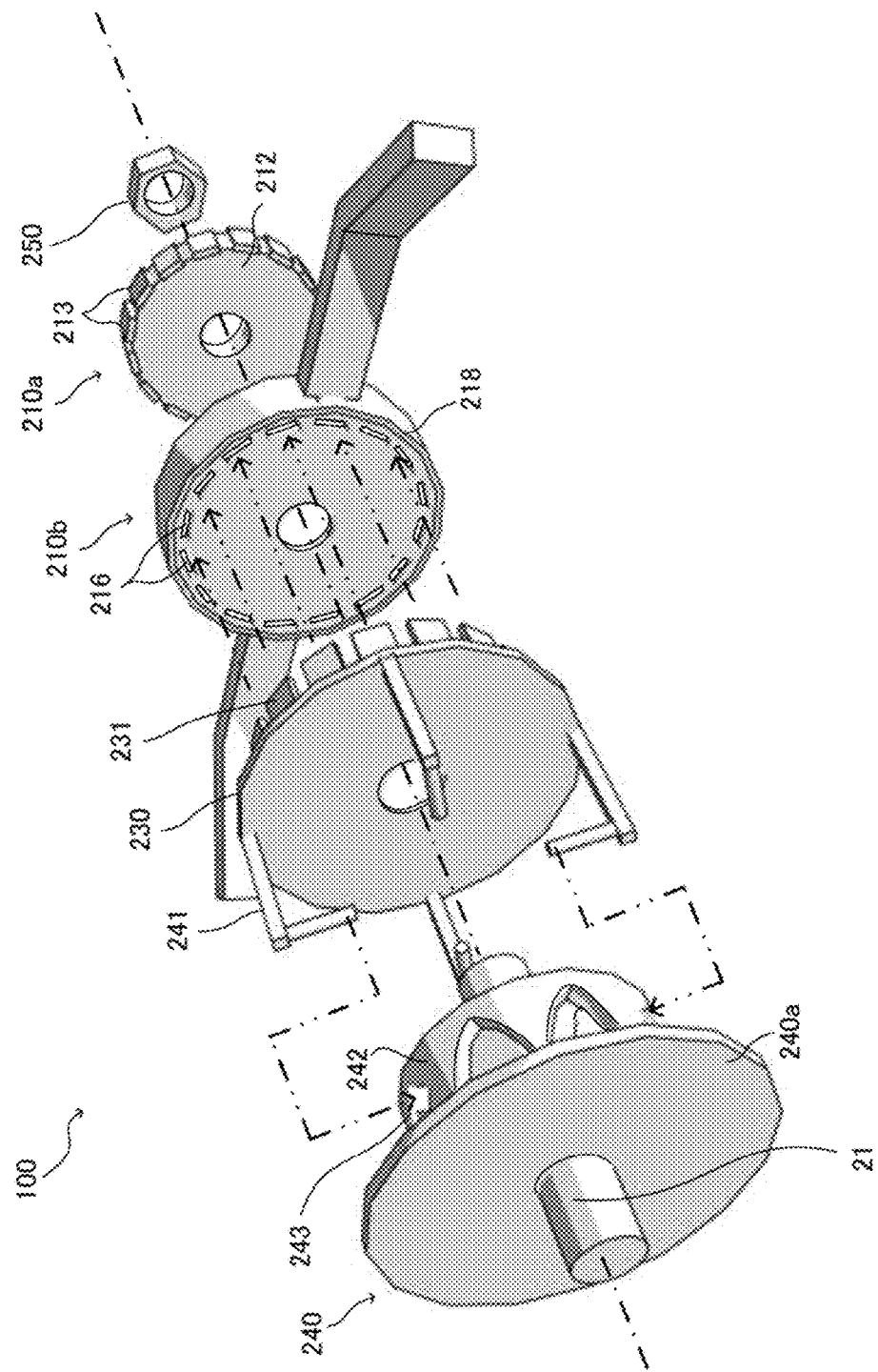

ROTATION ASSISTANCE MECHANISM

CROSS-REFERENCES TO RELATED APPLICATIONS

This application claims the benefit of priority and is a Continuation application of the prior International Patent Application No. PCT/JP2017/008919, with an international filing date of Mar. 7, 2017, which designated the United States, and is related to the Japanese Patent Application No. 2016-045574 filed Mar. 9, 2016, the entire disclosures of all applications are expressly incorporated by reference in their entirety herein.

TECHNICAL FIELD

The present invention relates to a rotation assistance mechanism and a rotating power mechanism equipped with same which can be generally applied to an apparatus which operates with a rotational driving force transmitted from a power source, and further relates to a bicycle, an electric fan, a belt conveyor, an escalator, a kneading machine, and a sign pole, which are equipped with the rotation assistance mechanism and the rotating power mechanism.

BACKGROUND ART

Conventionally, machines driven by rotating a rotation shaft have been used, such as bicycles, automobiles, electric fans, belt conveyors, escalators and kneading machines. For example, a user drives a bicycle to run on the ground by turning a pedal which is a rotational driving source to generate propulsive power by transmitting a rotational driving force therefrom to the front and rear wheels through a chain. The bicycles as used in this manner include the so-called assist bicycle equipped with an electric motor as a rotational driving source and a battery to reduce the efforts required for turning a pedal when starting or climbing up a slope. The pedaling force exerted on this assist bicycle by human power is detected by a detection unit (torque sensor or the like), which outputs a signal indicative of the pedaling force to a control device which drives the electric motor in accordance with the pedaling force (for example, refer to the Patent Document 1).

Incidentally, in the case of the machines which are rotationally driven as described above, when the power source is stopped, the transmitted driving force is lost, conventionally, an electric power of no lower than a predetermined level has to be constantly supplied in order to successively operate the device.

In order to solve the problem as described above, the inventors developed the rotation assistance mechanism that can impart momentum to the rotating shaft to assist the rotation of the machine thereof and improve the usefulness (Patent Document 2). In the present invention, the distance between magnetic members which are paired with opposite poles facing each other is made to change in predetermined cycles by the rotation of the bicycle wheels, by providing a shield unit having a pair of magnetic surfaces the poles of which are the opposite as the respective opposing surfaces of the magnetic members, and a shield drive unit configured to advance the shield unit to between the pair of magnetic members in predetermined cycles when the distance between the pair of magnetic members is contracted, and retract the shield unit from between the pair of magnetic members in the predetermined cycles when the distance between the pair of magnetic members is expanded.

In accordance with the invention as described above, since the shield unit is provided with the pair of magnetic surfaces facing the pair of magnetic members respectively and having magnetic polarities which are opposite to those of the corresponding surfaces of the pair of magnetic members respectively, the shield drive unit shields the attracting magnetic force by advancing the shield unit to between the pair of magnetic members when the distance between the pair of magnetic members is contracted, and generates a repulsive magnetic force between the pair of magnetic members with same poles facing each other by retracting the shield unit from between the pair of magnetic members when the distance between the pair of magnetic members is expanded. As a result, for example, by providing a rotation assistance mechanism to the bicycle, it is possible to pedal without requiring effort for some time.

PRIOR ART DOCUMENTS

Patent Documents

[Patent Document 1] Japanese Patent Published Application No. 09-123981
[Patent Document 2] Japanese Patent No. 5503092

SUMMARY OF THE INVENTION

Problems to be Solved by the Invention

However, since the configuration disclosed in the above-mentioned Patent Document 2 includes a part with opposite poles facing each other, the attractive force of the opposite poles is high, and if the shielding effect of the shield unit is sufficient, the opposite poles with get attached with just a slight shift in the timing, locking the rotation mechanism. Therefore, adjusting the timing is difficult with the technology of the Patent Document 2 and requires increase in configuration size of the shield unit to set a higher permissible value for the shift in timing. This had the problem that size and weight of the machine increases by that much and furthermore the energy losses also increase.

In order to solve the problem as described above, it is an object of the present invention to provide a rotation assistance mechanism that can easily adjust the operations, wherein a driving force is transmitted from a power source to rotationally drive an apparatus through a rotation axis to which intensity is imparted to assist the rotation thereof and improve the usefulness.

Means for Solving Problem

In order to accomplish the object as described above, the first invention is equipped with a rotation assistance mechanism of imparting intensity to the rotation of a rotation axis, comprising: a plurality of variable magnetic units that has a consecutive arrangement of a pair of magnetic members which are located with opposite poles facing each other such that the adjacent magnetic members are of the same polarity; a magnet drive unit configured to change the distance between the pair of magnetic members in predetermined cycles by the rotation of the rotation axis; a shield unit provided to be advanced to and retracted from between the pair of magnetic members facing each other; and a shield drive unit configured to advance the shield unit to between the pair of magnetic members in predetermined cycles when the distance between the pair of magnetic members is contracted, and retract the shield unit from between the pair of magnetic members in the predetermined cycles when the distance between the pair of magnetic members is expanded, wherein the shield unit has a pair of magnetic surfaces facing the pair of magnetic members respectively and having magnetic polarities which are opposite to those of the corresponding surfaces of the pair of magnetic members respectively.

In accordance with the invention as described above, since the shield unit has a pair of magnetic surfaces facing the pair of magnetic members respectively and having magnetic polarities which are same to those of the corresponding surfaces of the pair of magnetic members respectively, the shield drive unit generates a repulsive magnetic force by advancing the shield unit to between the pair of magnetic members when the distance between the pair of magnetic members is contracted, and an attracting force between the pair of magnetic members with opposite poles facing each other by retracting the shield unit from between the pair of magnetic members when the distance between the pair of magnetic members is expanded. As a result, it is possible to continuously generate the attractive force and repulsive force by the magnetic members, and impart intensity to the rotation of the rotation axis. In this case, in the variable magnetic unit, since adjacent magnetic members are arranged consecutively to have the same polarity, the magnetic surfaces of the shield unit will always have the same polarity as those of the corresponding opposite surfaces of the pair of magnetic members respectively, and there is no locking of the rotation mechanism by the attachment of the opposite poles, and adjusting the advancing and retracting timing of the shield unit becomes easy.

The second invention is equipped with a rotation assistance mechanism of imparting intensity to the rotation of a rotation axis, comprising: a plurality of variable magnetic units that has a consecutive arrangement of a pair of magnetic members which are located with same poles facing each other such that the adjacent magnetic members are of the same polarity; a magnet drive unit configured to change the distance between the pair of magnetic members in predetermined cycles by the rotation of the rotation axis; a shield unit provided to be advanced to and retracted from between the pair of magnetic members facing each other; and a shield drive unit configured to advance the shield unit to between the pair of magnetic members in predetermined cycles when the distance between the pair of magnetic members is contracted, and retract the shield unit from between the pair of magnetic members in the predetermined cycles when the distance between the pair of magnetic members is expanded, wherein the shield unit has a pair of magnetic surfaces facing the pair of magnetic members respectively and having magnetic polarities which are opposite to those of the corresponding surfaces of the pair of magnetic members respectively.

In accordance with the present invention as discussed above, the shield unit has a pair of magnetic surfaces facing the pair of magnetic members respectively and having magnetic polarities which are same to those of the corresponding surfaces of the pair of magnetic members respectively, the shield drive unit increases the repulsive magnetic force by advancing the shield unit to between the pair of magnetic members when the distance between the pair of magnetic members is contracted. On the other hand, the repulsive force generated between the pair of magnetic members in which the same polarities are arranged to face each other is reduced by retracting the shield unit from between the pair of magnetic members when the distance between the pair of magnetic members is expanded. As a result, it is possible to continuously change the intensity of the repulsive forces by the magnetic members, and impart intensity to the rotation of the rotation axis. In this case, in the variable magnetic unit, since adjacent magnetic members are arranged consecutively to have the same polarity, the magnetic surfaces of the shield unit will always have the same polarity as those of the corresponding opposite surfaces of the pair of magnetic members respectively, and there is no locking of the rotation mechanism by the attachment of the opposite poles, and adjusting the advancing and retracting timing of the shield unit becomes easy.

The third invention is equipped with a rotation assistance mechanism of imparting intensity to the rotation of a rotation axis, comprising: a variable magnetic unit that has a consecutive arrangement of a pair of magnetic members which are located with same poles facing each other such that the adjacent magnetic members are of the same polarity; a magnet drive unit configured to change the distance between the pair of magnetic members in predetermined cycles by the rotation of the rotation axis; a shield unit that provides a facing arrangement at a position with a distance that is shorter than the minimum separation distance between a pair of magnetic members in between the plurality of variable magnetic units arranged consecutively, the shield unit has a pair of magnetic surfaces facing the pair of magnetic members respectively and having magnetic polarities which are the same as the corresponding surfaces of the pair of magnetic members respectively and is retracted from between the pair of magnetic members in predetermined cycles when the distance between the pair of magnetic members is contracted and advanced to between the pair of magnetic members in predetermined cycles when the distance between the pair of magnetic members is expanded in predetermined cycles.

In accordance with the present invention as described above, the shield unit has a facing arrangement at the position with a distance that is shorter than the minimum separation distance between a pair of magnetic members in between the plurality of variable magnetic units arranged consecutively, and since the shield unit moves toward and away from between the pair of magnetic members in predetermined cycles when the distance between the pair of magnetic members is contracted, it is possible to continuously change the intensity of repulsive force by the magnetic members, and intensity can be imparted to the rotation of the rotation axis. In this case, in the variable magnetic unit, since adjacent magnetic members are arranged consecutively to have the same polarity, the magnetic surfaces of the shield unit will always have the same polarity as those of the corresponding opposite surfaces of the pair of magnetic members respectively, and there is no locking of the rotation mechanism by the attachment of the opposite poles, and adjusting the advancing and retracting timing of the shield unit becomes easy.

The fourth invention is equipped with a rotation assistance mechanism of imparting intensity to the rotation of a rotation axis, comprising: a variable magnetic unit that has a consecutive arrangement of a pair of magnetic members which are located with opposite poles facing each other such that the adjacent magnetic members are of the opposite polarity; a magnet drive unit configured to change the distance between the pair of magnetic members in predetermined cycles by the rotation of the rotation axis; the pair of magnetic members of the variable magnetic unit is formed such that the area of the magnetic members on one side is greater than the magnetic members of the other side, and the adjacent magnetic members are arranged in contact with each other.

In accordance with the invention as described above, since a pair of magnetic members which are located with opposite poles facing each other is consecutively arranged such that the adjacent magnetic members are of different polarity, the distance between the pair of magnetic members is widened and narrowed periodically, it is possible to continuously generate the attractive force and the repulsive force by the magnetic members, and intensity can be imparted to the rotation of the rotation axis.

In the case of the above invention, it is preferred that the variable magnetic unit comprising: an inner ring unit in the form of a cylinder which rotates together with the rotation of the rotation axis and provided with a plurality of one member of the pair of magnetic members arranged consecutively on its outer surface; and an outer ring unit in the form of a cylinder which is separated from the rotation of the rotating shaft and fitted on the outside of the inner ring and provided with a plurality of the other member of the pair of magnetic members arranged consecutively of its inner surface, that the magnet drive unit has a rotary member that which rotates together with the rotation axis and rotates the inner ring unit in relation to the outer ring unit by the rotation of the rotation axis, that the shield unit is provided with a plurality of projection members having the magnetic surfaces in the front and back sides thereof, and moves the projection members forward and backward between the outer surface of the inner ring unit and the inner surface of the outer ring unit, that the shield drive unit includes a cylindrical groove cam which converts the rotation force of the rotary member to the forward and backward motion of the projection member, and that the shield drive unit advances the magnetic surfaces of the projection members between the magnetic members of the inner ring unit and the magnetic members of the outer ring unit in predetermined cycles with the timing when the magnetic members of the outer ring unit come close to the magnetic members of the inner ring unit with opposite polarities respectively and retracts the magnetic surfaces of the projection members from between the magnetic members of the inner ring unit and the magnetic members of the outer ring unit in the predetermined cycles with the timing when the magnetic members of the outer ring unit come close to the magnetic members of the inner ring unit with the same polarities respectively.

In this case, since the shield unit of the present embodiment is provided with the plurality of projection members having the magnetic surfaces on the front and back sides thereof respectively, the magnetic surfaces of the projection members can be advanced between the magnetic members of the inner ring unit and the magnetic members of the outer ring unit with the timing when the magnetic members of the outer ring unit come close to the magnetic members of the inner ring unit respectively in synchronization with the rotation of the rotation axis. Furthermore, the magnetic surfaces of the projection members can be retracted from between the magnetic members of the inner ring unit and the magnetic members of the outer ring unit in the predetermined cycles with the timing when the magnetic members of the outer ring unit come close to the magnetic members of the inner ring unit with the same polarities respectively. As a result, it is possible to continuously generate intensity of the magnetic force by the magnetic members and impart intensity to the rotation of the rotation axis, and therefore improve the usefulness by assisting the rotation thereof.

In the case of the above invention, it is preferred that the shield unit is arranged at an inclination with a predetermined angle to the tangential direction of the rotation circle of the inner ring. In this case, the magnetic field of the magnetic surfaces can be tilted in the rotation direction by tilting the magnetic surfaces arranged on the front and back sides of the projection members with respect to the rotation circle, and it is possible to continuously generate magnetic force intensity effective for rotation.

Meanwhile, the rotation assistance mechanism as described above can be constructed as a rotating power mechanism, which is another invention, by combining with a power source configured to generate a rotational driving force for rotating a rotation axis. This rotating power mechanism can be used for an electric fan, a belt conveyor, an escalator, a sign pole, a kneading machine or the like which are further inventions. Particularly, the rotating power mechanism turns on/off the driving force generation mechanism of a power source to generate the rotational driving force intermittently in synchronization with the timing that the magnetic members of the rotation assistance mechanism generate an attracting force or a repulsive force.

More specifically, the above electric fan comprises any one of the rotating power mechanisms as recited in the above description; a blade assembly having a plurality of blades; and an electric machine configured to rotationally drive the blade assembly as the power source, the rotation axis is provided as a link member for transmitting the torque generated by the electric machine to the blade assembly.

Since the electric fan as discussed above is provided with the rotation axis as a link member for transmitting the driving force generated by the electric machine to the blade assembly, when a driving force is transmitted to this rotation axis, the rotation assistance mechanism is operated to continuously generate an attracting force and a repulsive force with the magnetic members and impart momentum to the rotation of the rotation axis so that it is possible to temporarily increase the air flow from the blade assembly. Furthermore, since momentum is imparted to the rotation of the rotation axis, the driving force generation mechanism of the power source is turned on/off to generate the rotational driving force intermittently in synchronization with the timing that the magnetic members of the rotation assistance mechanism generate an attracting force or a repulsive force, and it is possible to temporarily reduce the power consumption.

Furthermore, for the electric fan discussed above, it is possible to add variation to the rotation of the rotation axis, for example, in the form of irregularities such as "fluctuations", by generating the attracting force and the repulsive force with the magnetic members. As a result, air flows can be generated with variations in intensity.

Also, the belt conveyor comprises any one of the rotating power mechanisms as recited in the above description; an endless transfer belt which is wound and spanned between a pair of rollers; and an electric machine configured to rotationally drive the rollers as the power source to endless move the transfer belt, the rotation axis is provided as a link member for transmitting the driving force generated by the electric machine to the rollers.

Since the belt conveyor as discussed above is provided with the rotation axis as a link member for transmitting the driving force generated by the electric machine to the rollers of the respective devices, when a driving force is transmitted to this rotation axis, the rotation assistance mechanism is operated to continuously generate an attracting force and a repulsive force with the magnetic members and impart momentum to the rotation of the rotation axis so that it is possible to impart momentum to the rotation of the rotation axis to rotate the rollers. As a result, it is possible to temporarily reduce the power consumption by turning on/off the driving force generation mechanism of the power source to generate the rotational driving force intermittently in synchronization with the timing that the magnetic members of the rotation assistance mechanism generate an attracting force or a repulsive force.

Furthermore, the escalator comprises any one of the rotating power mechanisms as recited in the above description; a circulating member which is wound and spanned between a pair of sprockets and circularly move between the pair of sprockets; an electric machine configured to rotationally drive the sprockets as the power source to endless move the circulating member; and a plurality of footboards which are arranged in an endless fashion along the circulating member, linked with the circulating member to circularly move together with the circulating member and having treads on which passenger can stand, wherein the rotation axis is provided as a link member for transmitting the driving force generated by the electric machine to the sprockets.

Since the escalator as discussed above is provided with the rotation axis as a link member for transmitting the driving force generated by the electric machine to the sprockets of the respective devices, when a driving force is transmitted to this rotation axis, the rotation assistance mechanism is operated to continuously generate an attracting force and a repulsive force with the magnetic members and impart momentum to the rotation of the rotation axis so that it is possible to impart momentum to the rotation of the rotation axis to rotate the sprockets. As a result, it is possible to temporarily reduce the power consumption by turning on/off the driving force generation mechanism of the power source to generate the rotational driving force intermittently in synchronization with the timing that the magnetic members of the rotation assistance mechanism generate an attracting force or a repulsive force.

Still further, the kneading machine comprises any one of the rotating power mechanisms as recited in the above description; a casing in which a material to be kneaded is supplied; a stirring unit installed in the casing; an electric machine configured to rotationally drive the stirring unit, wherein the rotation axis is provided as a link member for transmitting the driving force generated by the electric machine to the stirring unit.

Since the kneading machine as discussed above is provided with the rotation axis as a link member for transmitting the driving force generated by the electric machine to the stirring unit, when a driving force is transmitted to this stirring unit, the rotation assistance mechanism is operated to continuously generate an attracting force and a repulsive force with the magnetic members and impart momentum to the rotation of the rotation axis so that it is possible to increase the stirring ability by accelerating the rotation of the stirring means. Furthermore, since momentum is imparted to the rotation of the rotation axis, the driving force generation mechanism of the power source is turned on/off to generate the rotational driving force intermittently in synchronization with the timing that the magnetic members of the rotation assistance mechanism generate an attracting force or a repulsive force, and it is possible to temporarily reduce the power consumption. Furthermore, in accordance with the present embodiment, it is possible to add variation to the rotation of the rotation axis, for example, in the form of irregularities such as "fluctuations", by generating the attracting force and the repulsive force with the magnetic members. As a result, in accordance with the kneading machine, the material to be kneaded can be stirred with variations in strength.

Still further, the sign pole comprises any one of the rotating power mechanisms as recited in the above description; a transparent external cylinder; a rotary cylinder which is rotatably supported in relation to the external cylinder and capable of rotating in the external cylinder; an electric machine configured to rotationally drive the rotary cylinder as the power source, wherein the rotation axis is provided as a link member for transmitting the driving force generated by the electric machine to the rotary cylinder.

Since the sign pole as discussed above is provided with the rotation axis as a link member for transmitting the driving force generated by the electric machine to the stirring unit of the respective devices, when a driving force is transmitted to this rotation axis, it is possible to reduce the power consumption by turning on/off the driving force generation mechanism of the power source to generate the rotational driving force intermittently in synchronization with the timing that the magnetic members of the rotation assistance mechanism generate an attracting force or a repulsive force. Furthermore, in accordance with the present embodiment, it is possible to add variation to the rotation of the rotation axis, for example, in the form of irregularities such as "fluctuations", by generating the attracting force and the repulsive force with the magnetic members. As a result, in accordance with the sign pole, it is possible to enhance a designability in the motion of the rotary cylinder.

Effects of the Invention

As has been discussed above, in accordance with the present invention intensity is applied to the apparatus which is rotationally driven by the driving force transmitted from a power source through a rotation axis, it is possible to assist the rotation thereof and improve the usefulness.

BRIEF DESCRIPTION OF THE DRAWINGS

FIG. 2 is a perspective view for showing the structure of the rotation assistance mechanism in accordance with the first embodiment.

FIG. 3 is a perspective view for showing the structure of the rotation assistance mechanism in accordance with the first embodiment.

MODE FOR CARRYING OUT THE INVENTION

First Embodiment

In what follows, an embodiment of a rotation assistance mechanism in accordance with the present invention will be explained in detail. Meanwhile, in the case of the present embodiment, an example will be explained in the case where the rotation assistance mechanism of the present invention is applied to a wheel of a bicycle 10. However, the present invention can be applied also to all the machines which are rotationally driven such as the wheels of bicycles and automobiles, water wheels, windmills, and the machines provided with generators such as electric fans, belt conveyors, escalators, kneading machines and the like.
(Overall Configuration of Bicycle)

Figure 1:
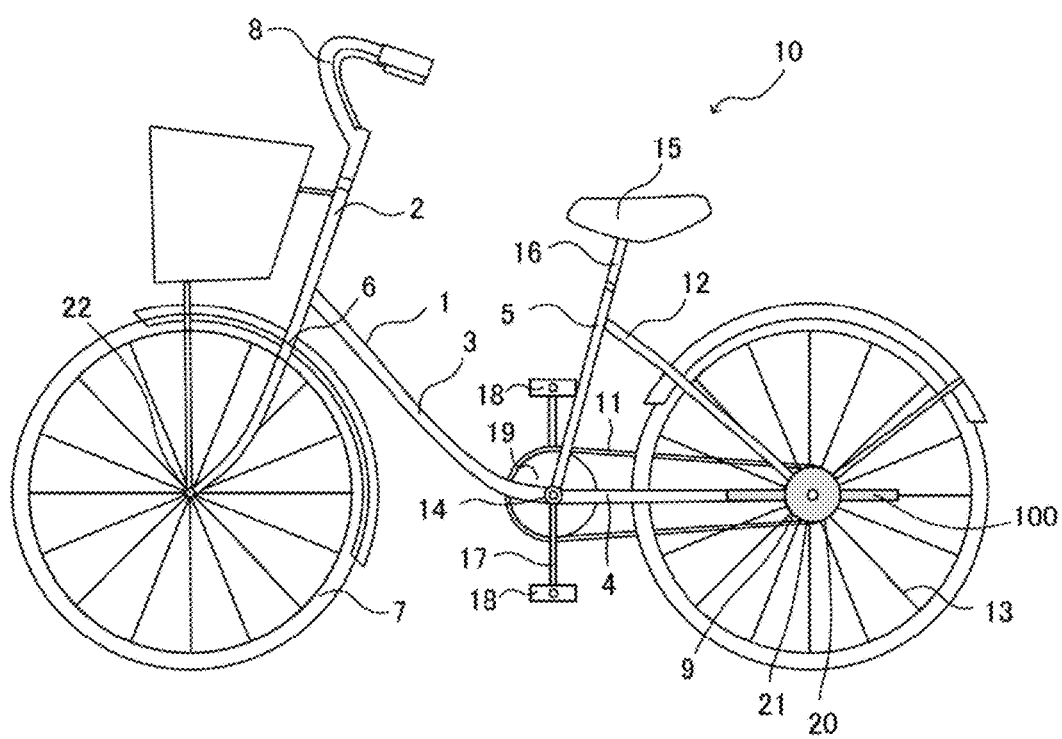
FIG. 1 is a schematic representation showing the overall configuration of a bicycle in accordance with a first embodiment.

FIG. 1 is a schematic representation showing the overall configuration of a bicycle 10 in accordance with a first embodiment of the present invention. The bicycle 10 of the present embodiment includes a body frame 1 having a head tube 2 located in the front side of the body frame 1, a down tube 3 extending from the head tube 2 in the rear-downward direction, a rear fork 4 connected to the down tube 3 and extending in the rear direction, and a seat post 5 rising upward from the lowermost end of the down tube 3.

A front fork 6 is rotatably supported on the head tube 2. Also, the lower end of the front fork 6 is provided with a hub 22 through which the entirety of a front wheel 7 is axially supported on an axle. Furthermore, the upper end of the front fork 6 is provided with a handlebar 8. Meanwhile, although not shown in the figure, the handlebar 8 is provided with brake levers for the front and rear wheels. Cables are extracted from the brake levers and linked with a front wheel brake and a rear wheel brake respectively.

A crank shaft 14 extending in the lateral direction of the body frame is supported at the crossed section between the down tube 3 and the seat post 5, and connected to the pedals 18 through cranks 17. The crank shaft 14 is connected to a driving sprocket 19 so that the pedal force exerted on the pedals 18 is transmitted to the driving sprocket 19. A chain 11 is spanned between the driving sprocket 19 and a non-driven sprocket 20 which is fixed to the axle 21 of a rear wheel 13.

The seat post 5 is provided with a support shaft 16 having an upper end on which a seat 15 is mounted in order that the height of the seat 15 can be adjusted. Also, a pair of left and right stays 12 are connected to the upper end of the seat post 5, extending in the rear-downward direction, and joined with the rear fork 4 near the lower end thereof. The rear wheel 13 is supported on the axle 21 which is horizontally extending in the right and left direction of the body frame on a rear end 9 where the rear fork 4 and the stays 12 are crossing and connected to each other. The rotation assistance mechanism 100 of the present embodiment is supported by the rear end 9 and located coaxially with the axle 21 which is the rotation axis of the rear wheel 13.
(Rotation Assistance Mechanism)

Figure 4A:
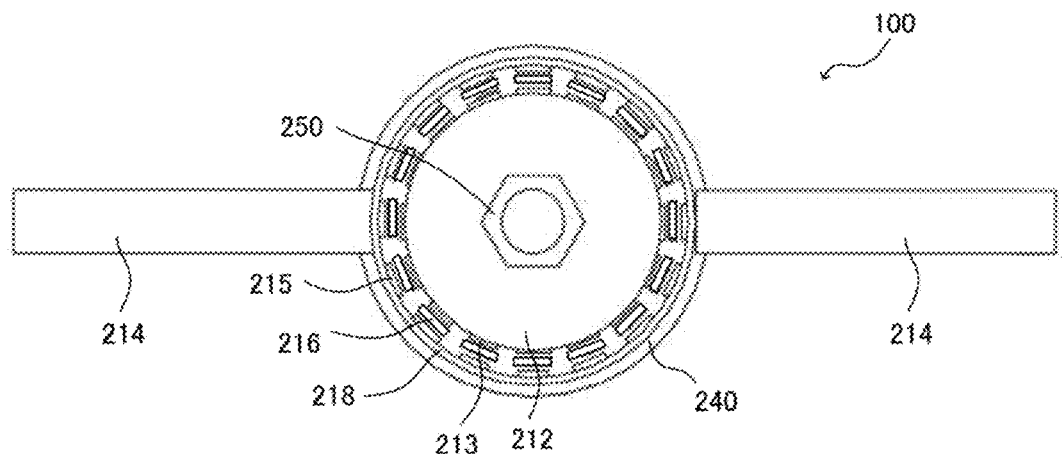
FIG. 4A is a front view for showing the structure of the rotation assistance mechanism in accordance with the first embodiment.
Figure 4B:
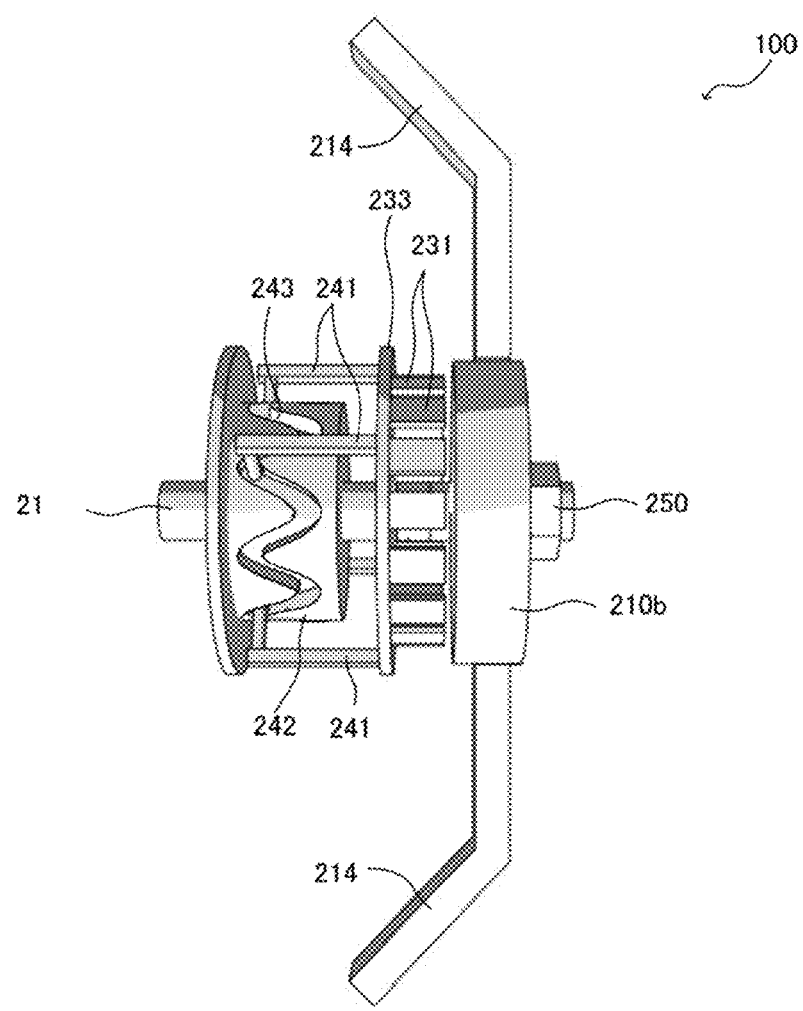
FIG. 4B is the top view.
Figure 5:
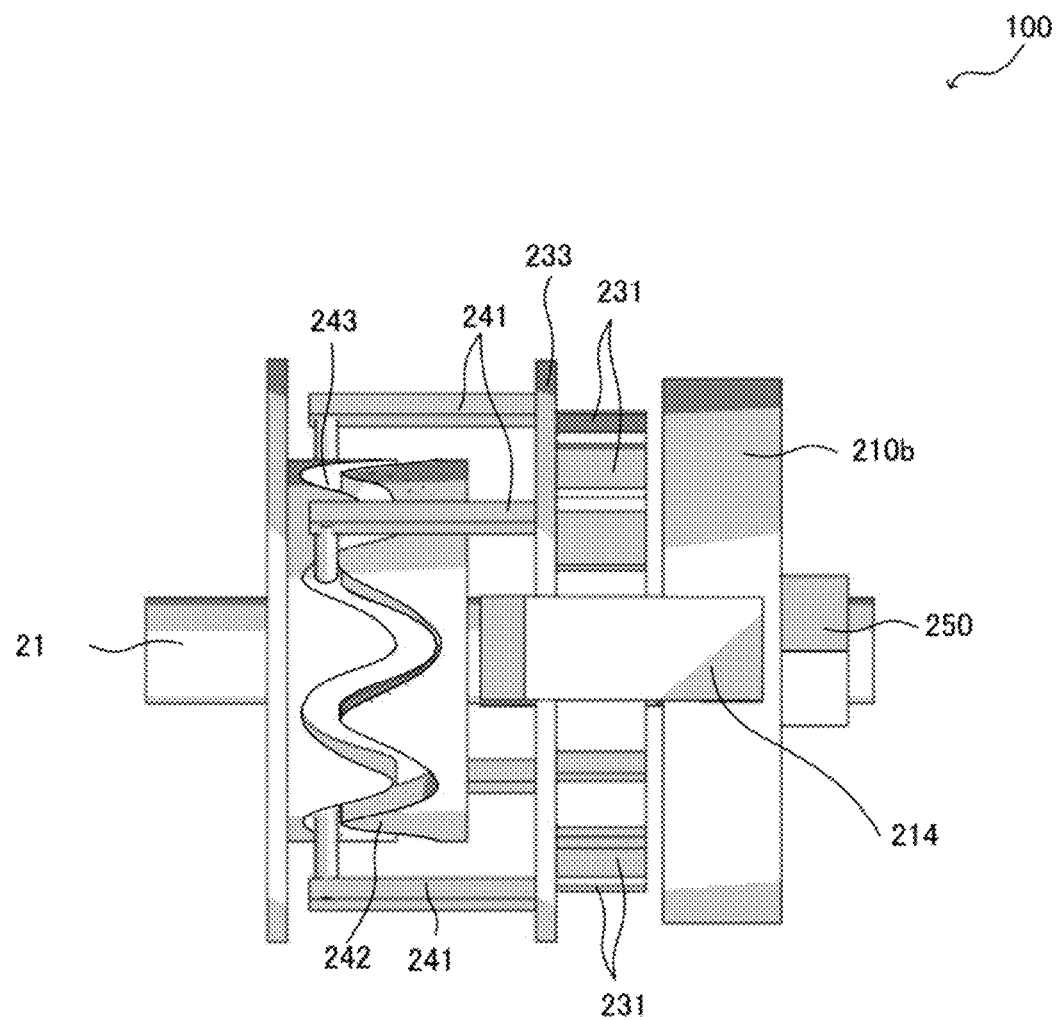
FIG. 5 is a side view for showing the structure of the rotation assistance mechanism in accordance with the first embodiment.

Next, the configuration of the rotation assistance mechanism 100 will be explained. FIG. 2 and FIG. 3 are perspective views for showing the structure of a rotation assistance mechanism 100 in accordance with the first embodiment as exploded views; FIG. 4A is a top view thereof; FIG. 4B is a front view thereof; and FIG. 5 is a side view thereof.

As illustrated in FIG. 2 to FIG. 5, the rotation assistance mechanism 100 is a mechanism for imparting intensity to the rotation of the axle 21 and rear wheel 13, and provided with the variable magnetic unit 210 for imparting intensity to the rotation of the rear wheel 13 through the axle 21 by the use of the attracting force or repulsion force of a magnet, a magnet drive unit consisting of the axle 21 and a stopper member 250 for driving the variable magnetic unit 210, a shield unit 230 for imparting intensity to the attracting force of the variable magnetic unit 210, and a shield drive unit 240 for periodically driving the shield unit 230. The gist of the present embodiment resides in the arrangement of a cylindrical inner ring and an outer ring on a concentric axis, and arrangement of a number of magnetic members on the side faces of each cylinder as the variable magnetic unit 210 to generate a suction force and a repulsion force by the magnetic members. The power source of the magnet drive unit and the shield drive unit 240 is the axle 21 which is the rotation axis of the rear wheel 13. The rotation force of the axle 21 is transmitted to an inner ring unit 210a through the stopper member 250 of the magnet drive unit, and transmitted directly to a rotary member 242 of the shield drive unit 240.

Figure 7A:
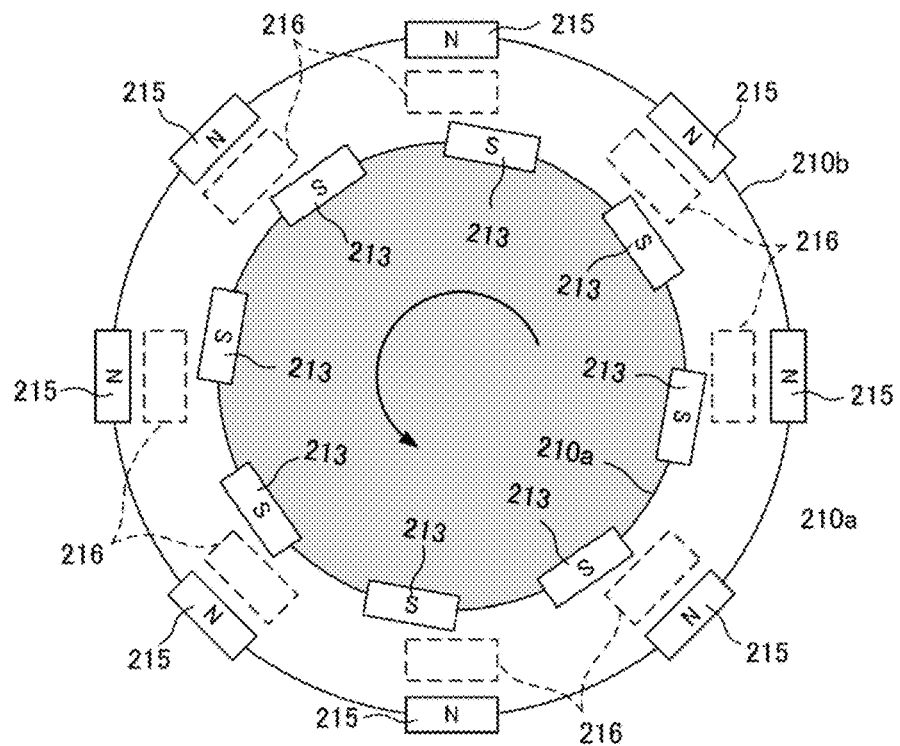
FIGS. 7A and 7B show views for explaining the positional relationship of the magnetic members facing each other in accordance with the first embodiment.
Figure 7B:
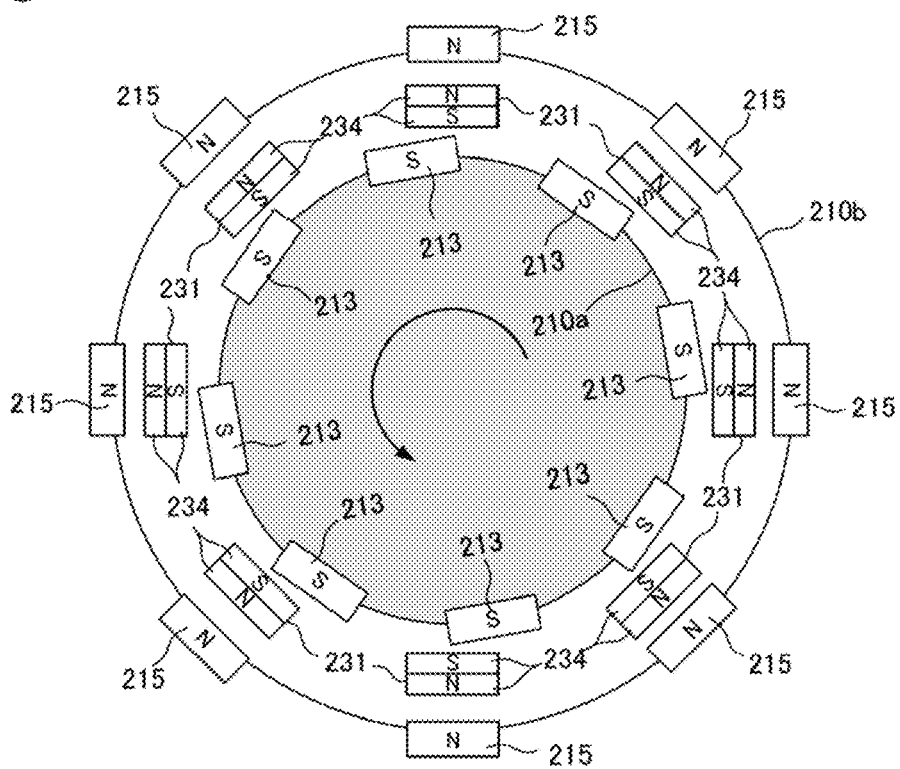

The variable magnetic unit 210 as shown even in FIGS. 7A and 7B is a drive unit having magnetic members 213 and 215 which are paired with opposite poles facing each other. In the case of the present embodiment, the variable magnetic unit 210 includes the inner ring unit 210a in the form of a cylinder provided with a plurality of magnetic members 213 on its outer surface and the outer ring unit 210b in the form of a cylinder which is fitted inside the inner ring unit 210a and provided with a plurality of magnetic members 215 on its inner surface. The inner ring unit 210a and the outer ring unit 210b has a plurality of variable magnetic members arranged consecutively such that the adjacent magnetic members are of the same polarity. That is, the adjacent magnetic members 213 and 213 are arranged with the same S poles directed outward on the outer surface of the inner ring unit 210a. On the other hand, the adjacent magnetic members 215 and 215 are arranged with their N poles directed inwards on the inner surface of the outer ring unit 210b.

The inner ring unit 210a has a wheel unit 212 in the form of a disk as a base component with a center hole 211 in the center position of this wheel unit 212. The wheel unit 212 is fixed to the axle 21 which is inserted through the center hole 211 and rotatable integrally with the axle 21. More specifically, an indent section 252 is formed on the outer surface of the wheel unit 212 in the same profile as the stopper member 250, which is threaded on the axle 21 and fitted to the indent section 252 so that the wheel unit 212 and the stopper member 250 are integrally joined to transmit the rotation force of the axle 21 to the wheel unit 212. Then, when the wheel unit 212 rotates around the axle 21 in association with the rotation of the rear wheel 13, the inner ring unit 210a move the magnetic members 213 arranged on the outer surface thereof in relation to the outer ring unit 210b.

On the other hand, the outer ring unit 210b is provided with a housing section 218 in a bottomed cylindrical shape having a center hole 217 in the center position of its bottom portion through which the axle 21 is inserted in order that the outer ring unit 210b is separated from the rotation of the rear wheel 13. More specifically, the housing section 218 of the outer ring unit 210b is fixed to the main body of a bicycle through frame members 214 and 214 which are fixed to the rear end 9 of the bicycle and connected to the opposite sides of the housing section 218 in order that the axle 21 rotates in an idling condition as seen from the center hole 217 in order not to transmit the rotation of the rear wheel 13. On the other hand, the outer ring unit 210b has a hollow space with an outer opening to house the inner ring unit 210a, a number of the magnetic members 215 which are annularly arranged in the inner surface of the housing section 218, and a number of shield apertures 216 which are annularly arranged along the perimeter of the bottom surface of the housing section 218 in correspondence with the arrangement of the magnetic members 215 respectively. The housing section 218 is fixed to the body frame of the bicycle by the frame members 214.

The magnet drive unit of the present embodiment consists of the axle 21 and the stopper member 250, and functions as a driving mechanism which changes the distance between the pair of magnetic members 213 and 215 in predetermined cycles by the rotation of the rear wheel 13. More specifically, the wheel unit 212 is rotated by the stopper member 250 which rotates integrally with the axle 21 of the rear wheel 13. The wheel unit 212 as a rotary member is a cylindrical member which is connected to the axle 21 and axially supports the inner ring unit 210a as discussed above. Then, when the wheel unit 212 rotates by the rotation of the rear wheel 13, the inner ring unit 210a rotates in relation to the outer ring unit 210b. Incidentally, the housing section 218 and the wheel unit 212 are spacially located close to each other, but mechanically separated from each other by a bearing or the like sliding mechanism (not shown in the figure) so that the rotation force of the wheel unit 212 is not transmitted to the housing section 218.

The shield unit 230 is provided with a plurality of projection members 231 which are arranged in a circular shape to project toward the shield apertures 216 and can be advanced between the outer surface of the inner ring unit 210a and the inner surface of the outer ring unit 210b. The projection member 231 has magnetic surfaces 234 on the front and back sides thereof. The magnetic surface 234 has opposite polarities on the front and back sides.

The shield drive unit 240 is a driving mechanism which advances the magnetic surfaces 234 of the projection members 231 between the magnetic members 213 of the inner ring unit 210a and the magnetic members 215 of the outer ring unit 210b in predetermined cycles with the timing when the magnetic members 215 of the outer ring unit 210b come close to the magnetic members 213 of the inner ring unit 210a with opposite polarities respectively and retracts the magnetic surfaces 234 of the projection members 231 from between the magnetic members 213 of the inner ring unit 210a and the magnetic members 215 of the outer ring unit 210b in the predetermined cycles with the timing when the magnetic members 215 of the outer ring unit 210b come close to the magnetic members 213 of the inner ring unit 210a with the same polarities respectively. More specifically, the shield drive unit 240 consists of a rotary member 242 in the form of a column and four coupling pins 241.

The rotary member 242 is a cylindrical piece connected to the axle 21 and provided with a flange 240a in the form of a disk for protecting the mechanism, and fixed to the axle 21 to rotate by following the axle 21. In addition, a guide groove 243 is carved on the outer peripheral surface of the rotary member 242 to form a cylindrical groove cam which converts the rotation force of the rotary member 242 to the forward and backward motion of the shield unit 230. More specifically, this guide groove 243 is carved in the form of a sine wave closed as an endless loop such that the distance to the outer ring unit 210b varies in accordance with the position on the axle 21. The distance to the outer ring unit 210b at four points on the guide groove 243 symmetrically located with the axle 21 as the center is widened and narrowed in accordance with the position on the axle 21.

Also, the four coupling pins 241 are rod members projecting from the base 233 of the shield unit 230. In the case of the present embodiment, the four coupling pins 241 project from the side opposite to the side from which the projection member 231 are projecting. The base 233 is a plate member in the form of a disk with a center hole 232 which is opened through the front and back sides and through which the axle 21 is inserted. The base 233 is axially supported on the rotary member 242 through the coupling pins 241. This center hole 232 has an inner diameter which is slightly larger than the diameter of the axle 21 so that the axle 21 can rotate in this center hole 232 without transmitting the rotation of the axle 21 to the base 233. The base 233 can slidably move back and forward together with the coupling pins 241 and the projection members 231 only in the axial direction of the axle 21.

The four coupling pins 241 are inserted into the guide groove 243 as described above at four points on a concentric circle around the axle 21 as a center, guided through the guide groove 243 while the rotary member 242 is rotating, and thereby move the shield unit 230 close to and away from the outer ring unit 210b so that the projection members 231 are advanced to and retracted from between the pair of magnetic members 213 and 215 in predetermined cycles.

Specifically, the magnetic surfaces 234 of the projection members 231 are advanced between the magnetic members 213 of the inner ring unit 210a and the magnetic members 215 of the outer ring unit 210b with the timing when the magnetic members 215 of the outer ring unit 210b come close to the magnetic members 213 of the inner ring unit 210a with opposite polarities respectively, and retracted from between the magnetic members 213 of the inner ring unit 210a and the magnetic members 215 of the outer ring unit 210b with the timing when the magnetic members 215 of the outer ring unit 210b come close to the magnetic members 213 of the inner ring unit 210a with the same polarities respectively.

(Operation of Rotation Assistance Mechanism)

Figure 6A:
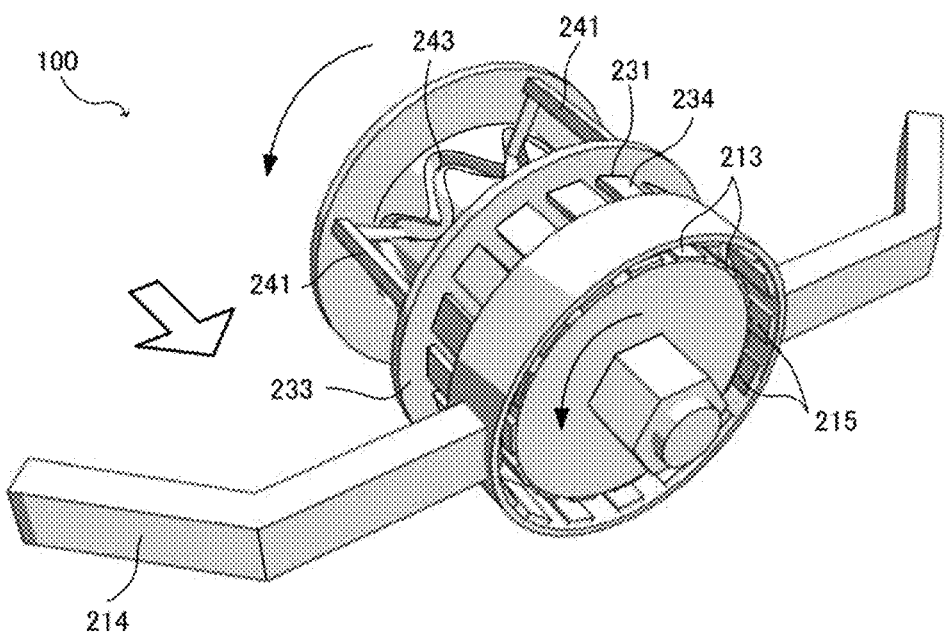
FIGS. 6A and 6B show perspective views of the rotation assistance mechanism of the first embodiment before and after operation in accordance with the second embodiment.
Figure 6B:
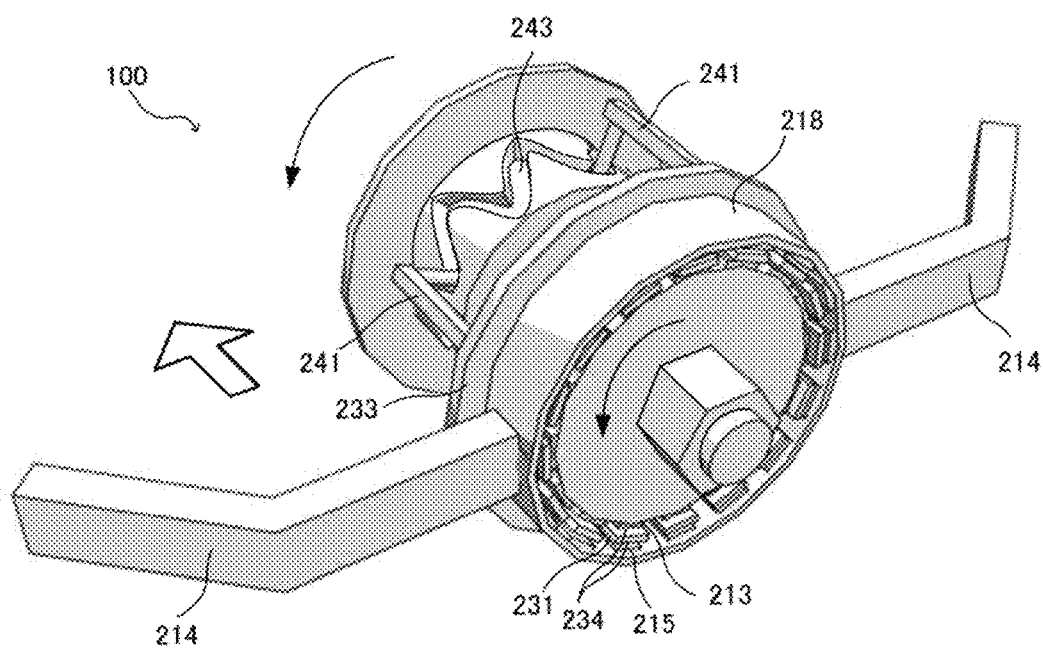

The operation of the rotation assistance mechanism 100 having the configuration as described above will be explained in the following description. FIGS. 6A and 6B show perspective views of the rotation assistance mechanism of the present embodiment before and after operation. FIGS. 6A and 6B show views for explaining the positional relationship of the magnetic members facing each other.

First, the rear wheel 13 of the bicycle 10 is rotated by turning the pedal 18 of the bicycle 10. The rotation of this rear wheel 13 is transmitted to the shield drive unit 240 and the magnet drive unit 220. When the rear wheel 13 rotates, the wheel unit 212 of the variable magnetic unit 210 connected to the axle 21 of the rear wheel 13 also rotates around the axle 21. This wheel unit 212 is fixed to the axle 21 with the stopper member 250 such as a nut, and rotates to move the magnetic members 213 arranged on the peripheral surface in relation to the outer ring unit 210b. In this case, the housing section 218 of the outer ring unit 210b and the wheel unit 212 of the inner ring unit 210a are mechanically separated from each other so that the rotation force of the wheel unit 212 is not transmitted to the housing section 218.

On the other hand, in synchronization with this rotation, the shield drive unit 240 converts the rotation force of the rotary member 242 to the forward and backward motion of the projection member 231. More specifically, the shield drive unit 240 advances the magnetic surfaces 234 of the projection members 231 between the magnetic members 213 of the inner ring unit 210a and the magnetic members 215 of the outer ring unit 210b with the timing when the magnetic members 215 of the outer ring unit 210b come close to the magnetic members 213 of the inner ring unit 210a with opposite polarities respectively.

First, the rotary member 242 axially supported on the axle 21 rotates in association with the rotation of the rear wheel 13 to advance this projection member 231. Since the rotary member 242 is provided with the guide groove 243 into which the four coupling pins 241 are inserted at symmetric positions with reference to the axle 21, as illustrated in FIG. 6A, the four coupling pins 241 inserted into this guide groove 243 are guided by the guide groove 243, and therefore the distance to the outer ring unit 210b is widened and narrowed when the rotary member 242 rotates.

Then, when the distance to the outer ring unit 210b is narrowed, the base 233 connected to the four coupling pins 241 is shifted also toward the outer ring unit 210b. As illustrated in FIG. 6B, the projection members 231 of the shield unit 230 are thereby inserted into the shield apertures 216, and enter between the magnetic member 213 of the inner ring unit 210a and the magnetic member 215 of the outer ring unit 210b.

At this time, as illustrated in FIG. 7B, the positional relationship between the magnetic member 213 of the inner ring unit 210a and the magnetic member 215 of the outer ring unit 210b is such that the magnetic members 215 of the outer ring unit 210b come close to the magnetic members 213 of the inner ring unit 210a with opposite polarities respectively.

With this timing, therefore, the magnetic surfaces 234 of the projection members 231 are advanced between the magnetic members 213 of the inner ring unit 210a and the magnetic members 215 of the outer ring unit 210b so that the magnetic members 213 and the magnetic members 215 face the magnetic surfaces 234 of the projection members 231 with the same polarities as illustrated in FIG. 7B to induce repulsive magnetic forces therebetween.

On the other hand, the shield drive unit 240 retracts the magnetic surfaces 234 of the projection members 231 from between the magnetic members 213 of the inner ring unit 210a and the magnetic members 215 of the outer ring unit 210b with the timing when the magnetic members 215 of the outer ring unit 210b come close to the magnetic members 213 of the inner ring unit 210a with the same polarities respectively.

Figure 13A:
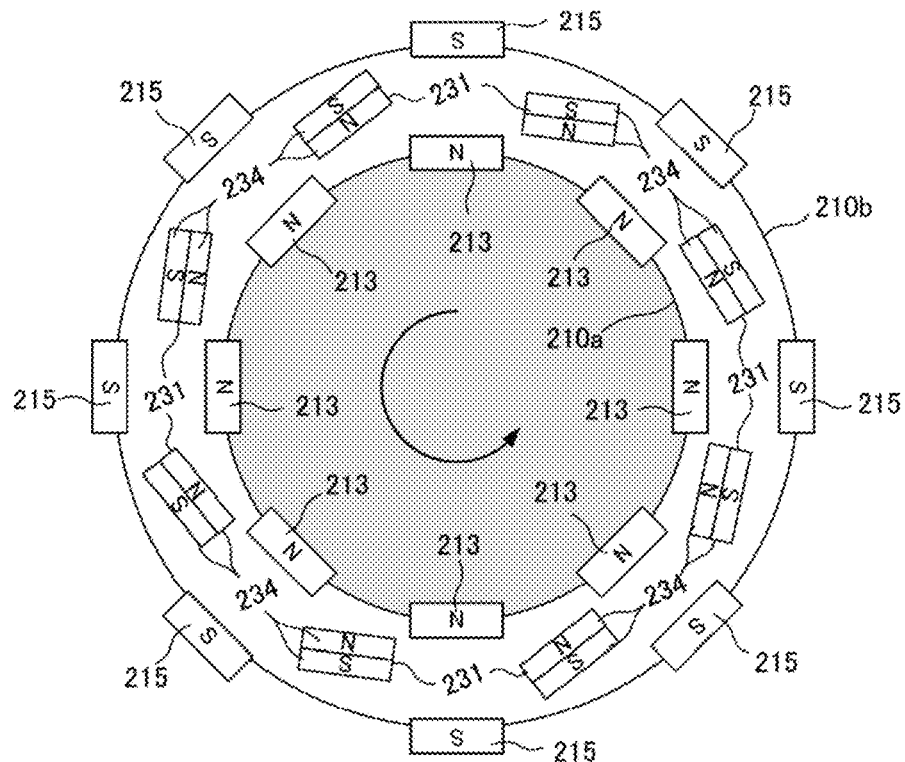
FIGS. 13A and 13B show views for explaining the positional relationship of the magnetic members facing each other in accordance with the modification examples of the second embodiment.

The retraction motion of the projection members 231 widens the distance to the outer ring unit 210b when the rotary member 242 rotates while the four coupling pins 241 inserted into the guide groove 243 are guided by the guide groove 243 as illustrated in FIG. 6A. Then, when the distance to the outer ring unit 210b is widened, the shield unit 230 connected to the four coupling pins 241 moves away from the outer ring unit 210b. In this case, as illustrated in FIG. 13A, the projection members 231 of the shield unit 230 are retracted from the shield apertures 216 to leave the space between the magnetic members 213 of the inner ring unit 210a and the magnetic members 215 of the outer ring unit 210b. At this time, as illustrated in FIG. 7A, the positional relationship between the magnetic members 213 of the inner ring unit 210a and the magnetic members 215 of the outer ring unit 210b is such that the magnetic members 215 of the outer ring unit 210b come close to the magnetic members 213 of the inner ring unit 210a with the same polarities respectively.

With this timing, therefore, when the magnetic surfaces 234 of the projection members 231 are retracted from between the magnetic members 213 of the inner ring unit 210a and the magnetic members 215 of the outer ring unit 210b, the magnetic members 213 and the magnetic members 215 face each other with the same polarities as illustrated in FIG. 7A to induce repulsive magnetic forces therebetween. This operation is continuously repeated in this manner.

(Actions/Effects)

As has been discussed above, since the shield unit 230 of the present embodiment is provided with the plurality of projection members 231 having the magnetic surfaces 234 on the front and back sides thereof respectively, a repulsive magnetic force can be generated by advancing the magnetic surfaces 234 of the projection members 231 between the magnetic members 213 of the inner ring unit 210a and the magnetic members 215 of the outer ring unit 210b with the timing when the magnetic members 215 of the outer ring unit 210b come close to the magnetic members 213 of the inner ring unit 210a with opposite polarities respectively in synchronization with the rotation of the rear wheel 13. Furthermore, an attractive force is generated between the paired magnetic members 213 and 215 with opposite poles facing each other by retracting the magnetic surfaces 234 of the projection members 231 from between the magnetic members 213 of the inner ring unit 210a and the magnetic members 215 of the outer ring unit 210b in the predetermined cycles with the timing when the magnetic members 215 of the outer ring unit 210b come close to the magnetic members 213 of the inner ring unit 210a with the same polarities respectively.

As a result, it is possible to continuously generate the attractive force and the repulsive force by the magnetic members 213 and 215, and impart intensity to the rotation of the rear wheel 13, and therefore lessen the pedaling burden for some time. Particularly, in accordance with the present embodiment, a number of magnetic members 213 and 215 are arranged on the cylindrical side surfaces respectively as the variable magnetic unit 210 to generate a stronger attracting force and a repulsive force with the magnetic members.
(Modification Examples)
(1) Modification Example 1

Incidentally, the description of the embodiment described above is an example of the present invention. The present invention is not limited to the embodiments described above, as long as it does not deviate from the technical idea of the present invention, various modifications are possible based on the design.

Figure 8A:
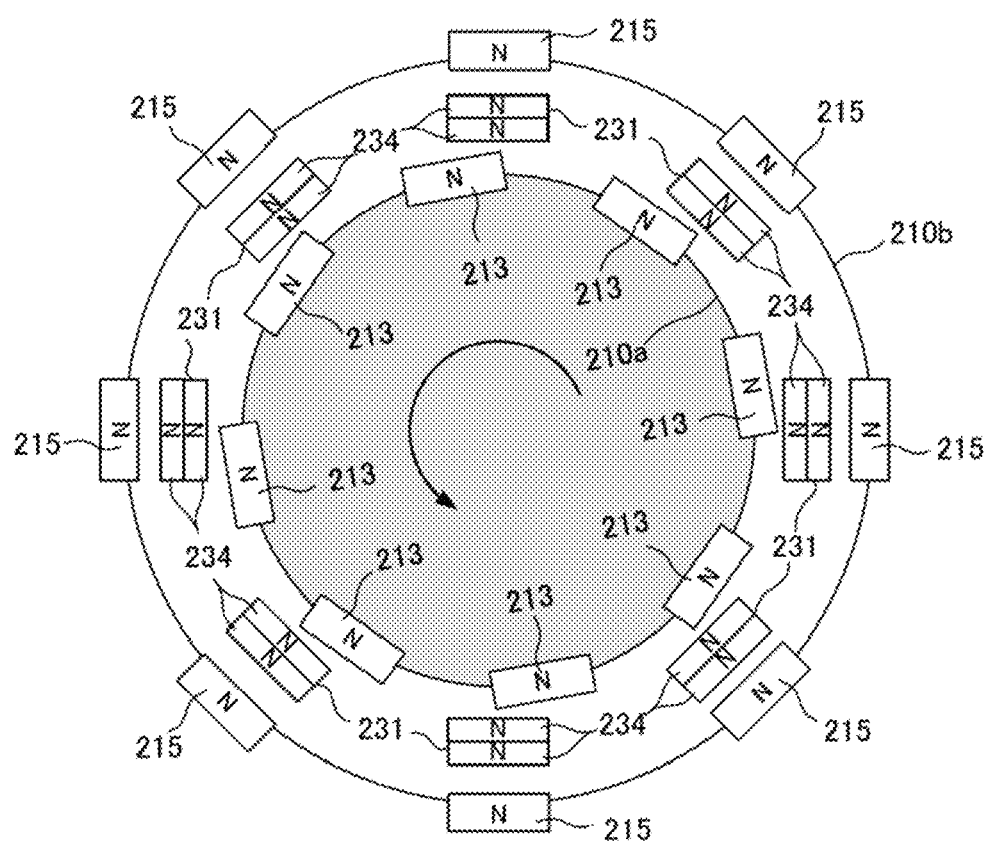
FIGS. 8A and 8B show views for explaining the positional relationship of the magnetic members facing each other in accordance with the modification examples of the first embodiment.
Figure 8B:
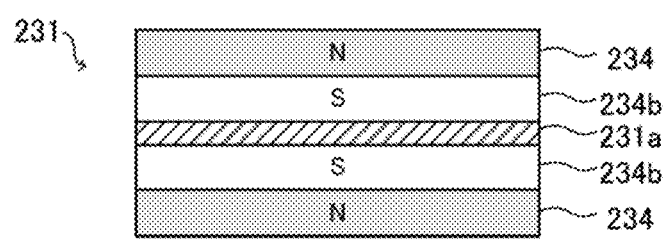

For example, the pair of magnetic members 215 and 213 are arranged with their opposite poles facing each other in the variable magnetic unit 210 of the above embodiment, but as illustrated in FIGS. 8A and 8B, they can also be arranged with their same poles facing each other instead. More specifically, the inner ring unit 210a and the outer ring unit 210b have a plurality of variable magnetic members arranged consecutively such that the adjacent magnetic members are of the same polarity. The adjacent magnetic members 213 and 213 are arranged with the same N poles directed outward on the outer surface of the inner ring unit 210a. On the other hand, the adjacent magnetic members 215 and 215 are arranged with their N poles directed inwards on the inner surface of the outer ring unit 210b.

Also, in this modification example, the magnetic surfaces 234 arranged on the front and back sides of the projection members 231 have been provided so as to have the same polarities as the corresponding opposite surfaces of the pair of magnetic members 215 and 213 respectively. As illustrated in FIG. 8B, the projection members 231 have magnetic members with N pole and S pole arranged on the front and back sides that are securely fixed using the adhesive members 231a that have adhesive surfaces on both the sides and configured such that the front and back sides have the same polarities. Meanwhile, in this modification example, the magnetic surfaces 234 arranged on the front and back sides of the projection members 231, as well as the magnetic members 215 and 213 are all shown as N poles, but they can also all be S poles instead.

Furthermore, the shield drive unit 240 advances the magnetic surfaces 234 of the projection members 231 to between the magnetic members 213 and magnetic members 215 with the timing when the magnetic members 215 of the outer ring unit 210b move away from the magnetic members 213 of the inner ring unit 210a and increases the repulsive force while separating. On the other hand, the shield drive unit 240 retracts the magnetic surfaces 234 of the projection members 231 from between the magnetic members 213 of the inner ring unit 210a and the magnetic members 215 of the outer ring unit 210b with the timing when the magnetic members 215 of the outer ring unit 210b come close to the magnetic members 213 of the inner ring unit 210a and reduces the repulsive force while coming close.

From these results, in accordance to this modification example, it is possible to continuously change the strength of repulsive forces by the magnetic members, and impart intensity to the rotation of the rotation axis. In this case, in the variable magnetic unit 210, since adjacent magnetic members are arranged consecutively to have the same polarity, the magnetic surfaces 234 of the shield unit 230 will always have the same polarity (in the illustrated example, N pole) as those of the corresponding opposite surfaces of the pair of magnetic members 215, 213 respectively, and there is no locking of the rotation mechanism by the attachment of the opposite poles and adjusting the advancing and retracting timing of the shield unit becomes easy.

(2) Modification Example 2

Figure 9A:
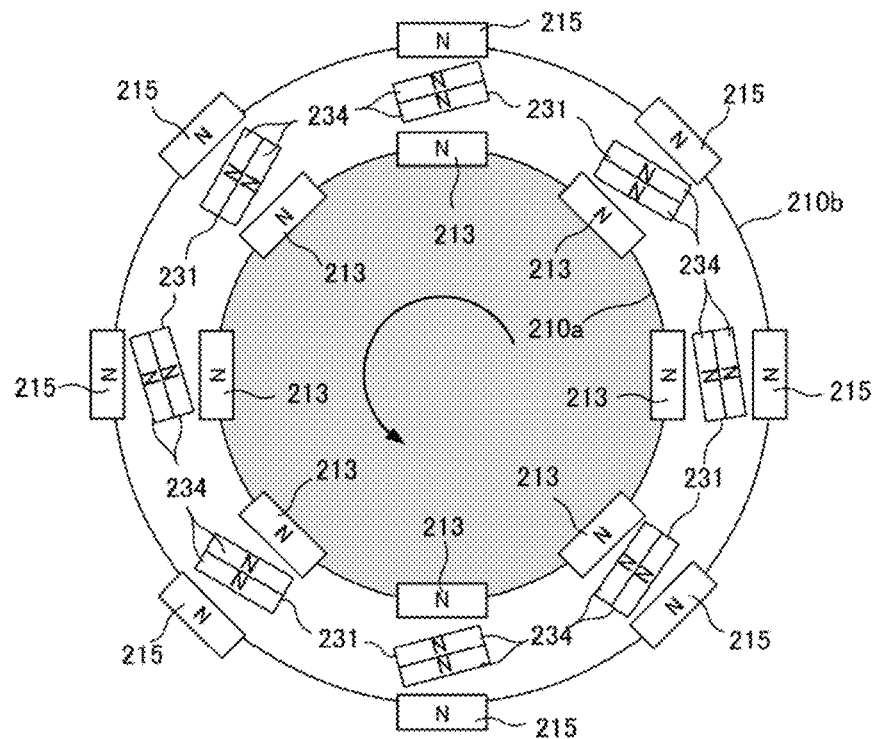
FIGS. 9A and 9B show views for explaining the positional relationship of the magnetic members facing each other in accordance with the modification examples of the first embodiment.

Also, as illustrated in FIG. 9A, in the embodiment and modification example described above, the projection members 231 can be arranged at an inclination with a predetermined angle to the tangential direction of the rotation circle of the inner ring unit 210a. In this case, the magnetic field of the magnetic surfaces 234 can be tilted in the rotation direction by tilting the magnetic surfaces 234 arranged on the front and back sides of the projection members 231 with respect to the rotation circle, and it is possible to continuously generate magnetic force intensity effective for rotation.

(3) Modification Example 3

Figure 9B:
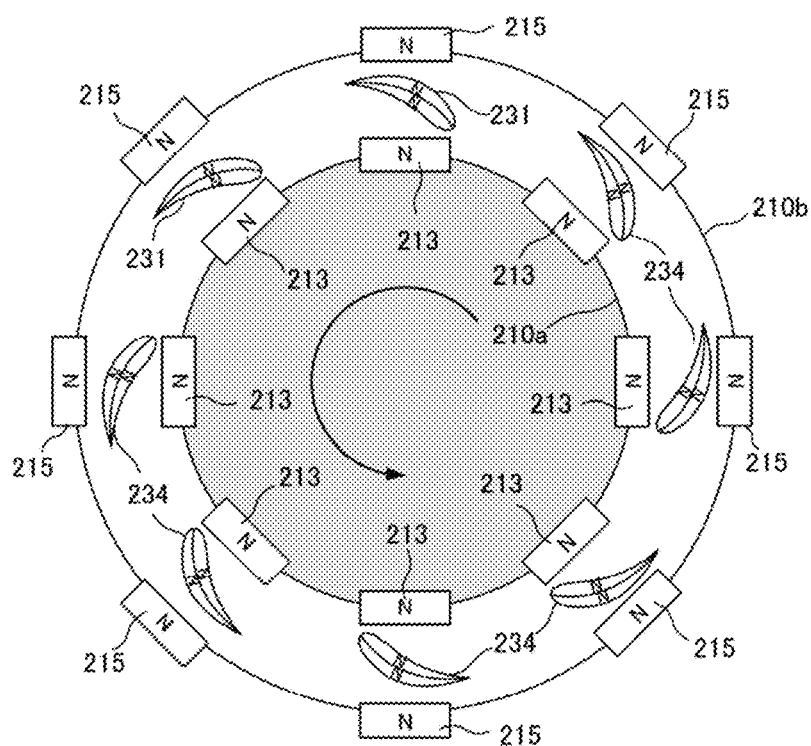
Figure 10:
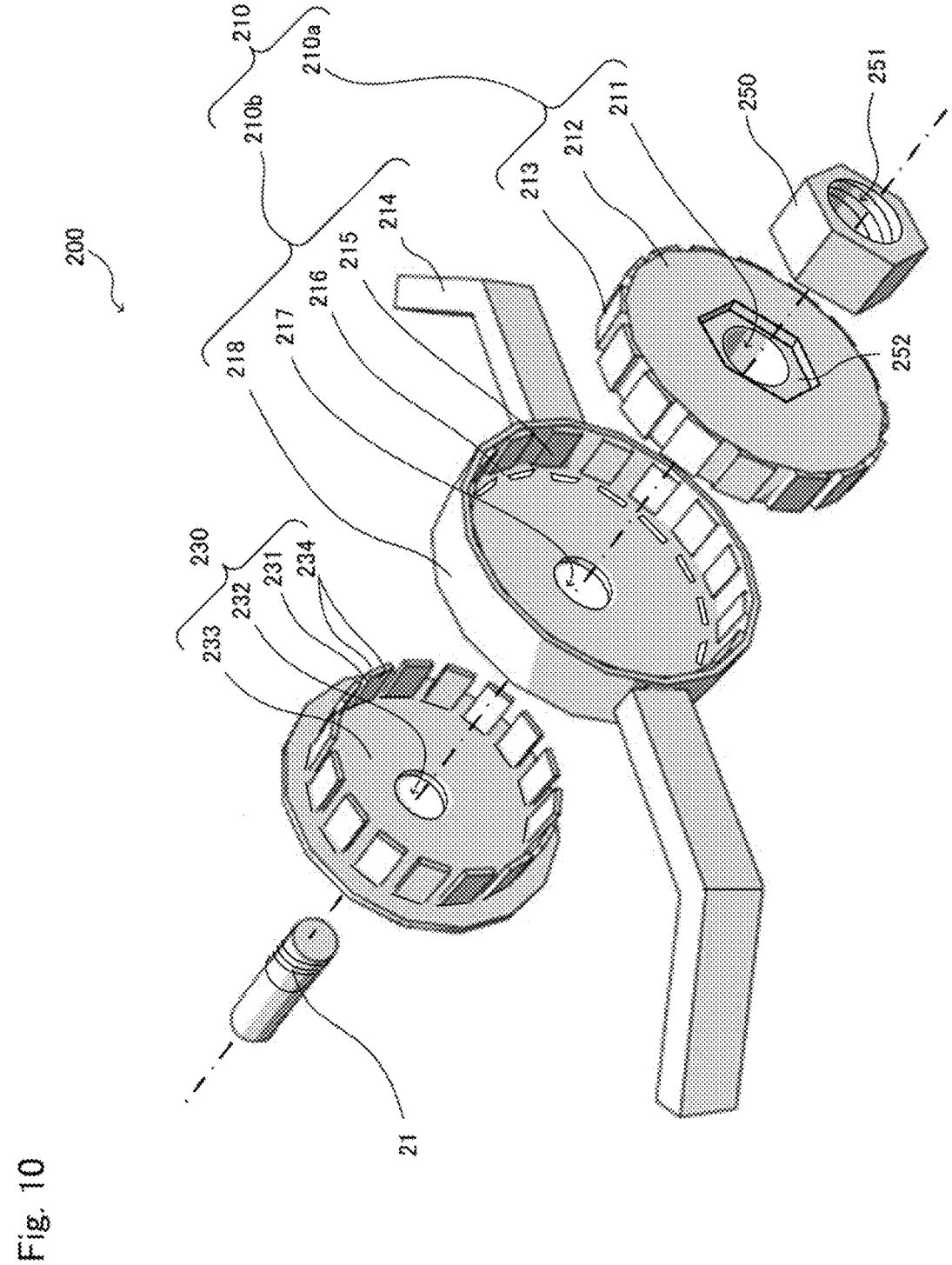
FIG. 10 is a perspective view for showing the structure of the rotation assistance mechanism in accordance with the second embodiment.
Figure 11:
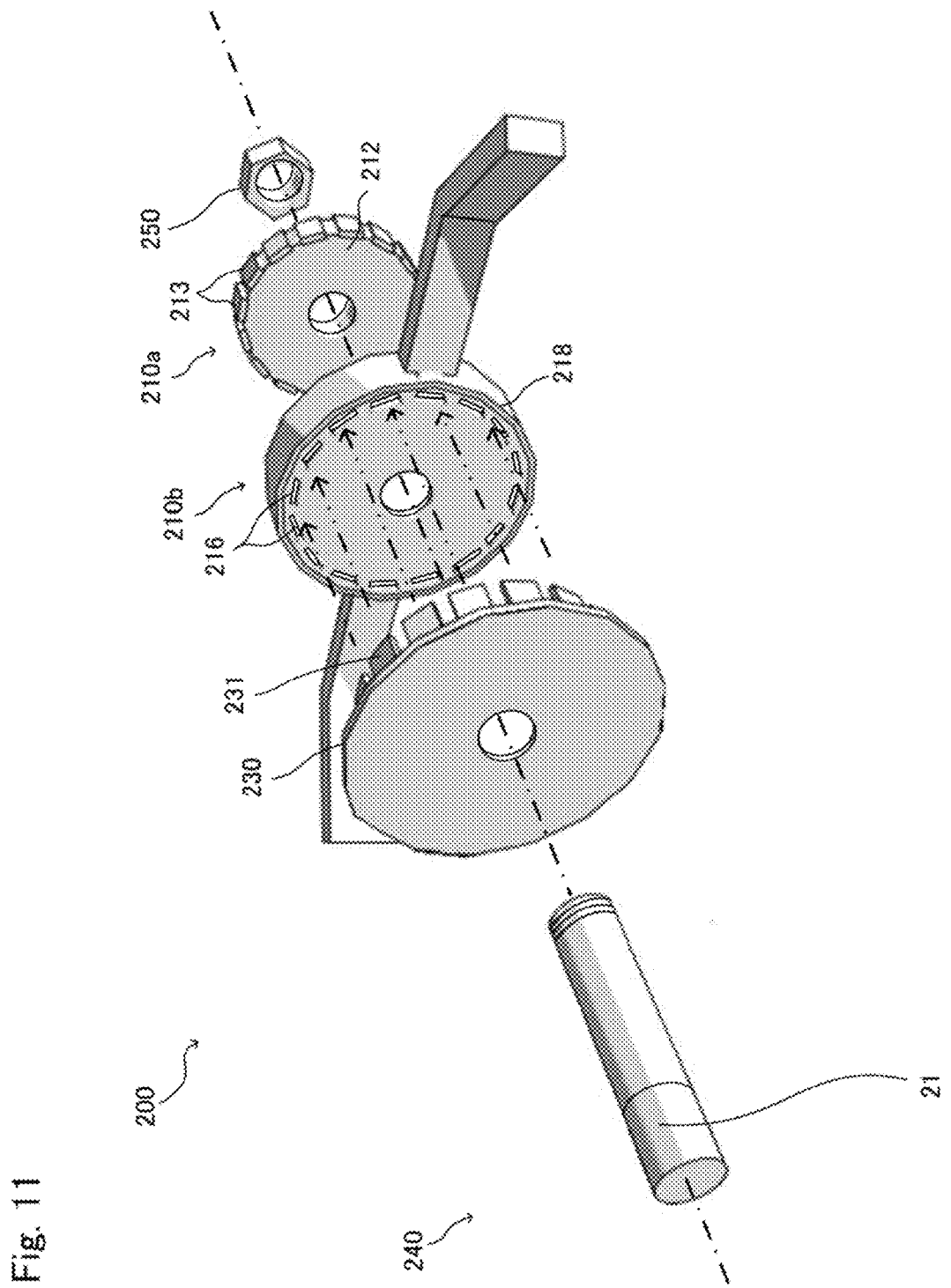
FIG. 11 is a perspective view for showing the structure of the rotation assistance mechanism in accordance with the second embodiment.

Furthermore, as illustrated in FIG. 9B, in the embodiment and modification examples described above, the horizontal cross-sectional shape of the projection members 231 can be formed into a curved and streamlined arcuate wing shape instead. In this case, in the same way as modification example 2 described above, the projection members 231 are arranged at an inclination with a predetermined angle to the tangential direction of the rotation circle of the inner ring unit 210a. In the projection members 231 with arcuate wing shape, curvature of the surface directed towards the outer ring unit 210b and curvature of the surface directed towards the inner ring unit 210a are different, and areas of the respective curved surfaces are different. In this way, since the resultant force of repulsive force exerted by each of the inner and outer magnetic members 215 and 213 is directed in the tangential direction of the rotating circle by forming the shield unit 230 into a curved and streamlined arcuate wing shape and inclining with a predetermined angle to the tangential direction of the rotation circle, it is possible to continuously generate a magnetic force intensity effective for rotation.

Second Embodiment

Next, a second embodiment of the present invention will be explained. In the case of the first embodiment as described above, the shield drive unit 240 has been configured to move toward and away from between the pair of magnetic members in predetermined cycles when the distance between the pair of magnetic members is contracted. However, the gist of the present embodiment is that the shield unit has a fixed arrangement with respect to the outer ring unit, and the shield unit is moved towards and away from between the pair of magnetic members only by the operation of the magnetic members of the inner ring unit. FIG. 10 to FIG. 12B are views for showing the rotation assistance mechanism in accordance with the present embodiment. Meanwhile, in the description of the present embodiment, like reference numbers indicate functionally similar elements as the above embodiment unless otherwise specified, and therefore no redundant description is repeated.

(Rotation Assistance Mechanism)

The configuration of the rotation assistance mechanism 200 will be explained in accordance with the present embodiment. As illustrated in FIG. 10 to FIG. 12B, the rotation assistance mechanism 200 is a mechanism for imparting intensity to the rotation of the axle 21 and rear wheel 13, and provided with the variable magnetic unit 210 for imparting intensity to the rotation of the rear wheel 13 through the axle 21 by the use of the attracting force or repulsion force of a magnet, a magnet drive unit consisting of the axle 21 and a stopper member 250 for driving the variable magnetic unit 210, a shield unit 230 for imparting intensity to the repulsive force of the variable magnetic unit 210. The gist of the present embodiment resides in the arrangement of a cylindrical inner ring and an outer ring on a concentric axis, and arrangement of a number of magnetic members on the side faces of each cylinder as the variable magnetic unit 210 to generate a suction force and a repulsion force by the magnetic members. The power source of the magnet drive unit is the axle 21 which is the rotation axis of the rear wheel 13. The rotation force of the axle 21 is transmitted to an inner ring unit 210a which is the magnetic drive unit through the stopper member 250.

Figure 12A:
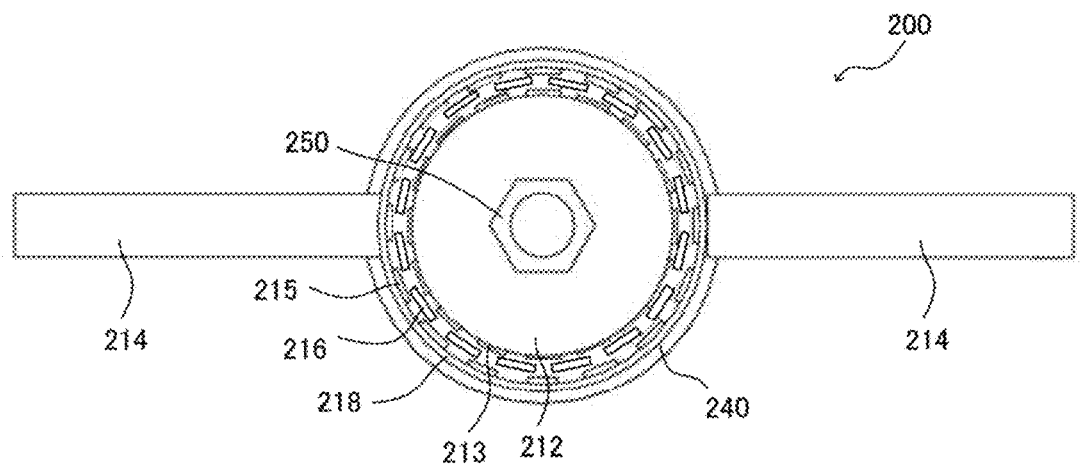
FIG. 12A is a front view for showing the structure of the rotation assistance mechanism in accordance with the first embodiment.
Figure 12B:
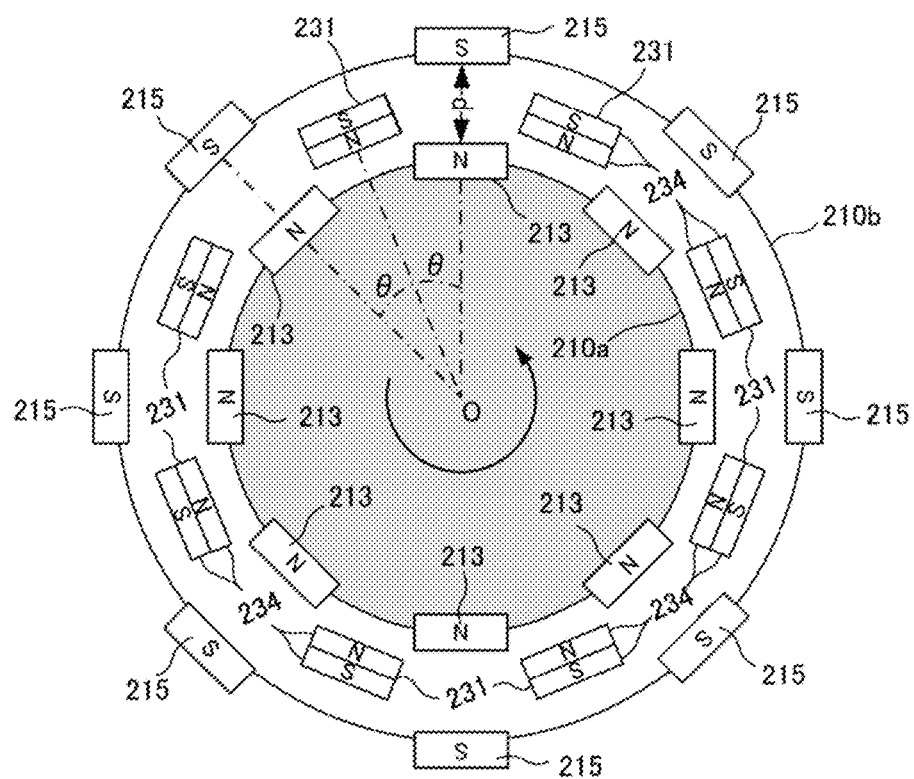
FIG. 12B shows views for explaining the positional relationship of the magnetic members facing each other

The variable magnetic unit 210 even as shown in FIG. 12B is a drive unit having magnetic members 213 and 215 which are paired with opposite poles facing each other. Even in the case of the present embodiment, the attraction unit 210 includes the inner ring unit 210a in the form of a cylinder provided with a plurality of magnetic members 213 on its outer surface and the outer ring unit 210b in the form of a cylinder which is fitted inside the inner ring unit 210a and provided with a plurality of magnetic members 215 on its inner surface. The inner ring unit 210a and the outer ring unit 210b has a plurality of variable magnetic members arranged consecutively such that the adjacent magnetic members are of the same polarity. That is, the adjacent magnetic members 213 and 213 are arranged with the same N poles directed outward on the outer surface of the inner ring unit 210a. Also, the adjacent magnetic members 215 and 215 are arranged with their S poles directed inwards even on the inner surface of the outer ring unit 210b. Meanwhile, the variable magnetic unit 210 has been configured with arrangement of opposite poles facing each other, but arrangement of same poles facing each other can be used instead.

In the case of the present embodiment, the magnetic surfaces 234 arranged on the front and back sides of the projection members 231 are arranged consecutively such that the adjacent magnetic surfaces 234, 234 are of the same polarity, and provided such that they are of the same polarity with respect to the magnetic poles on the facing surface of magnetic members 213 on the inner ring unit 210a side of the pair of magnetic members. That is, the projection members 231 are configured such that opposite poles are arranged on the front and back sides. Meanwhile, in this modification example, the magnetic members 215 and 213 has been illustrated as S and N poles respectively, these can be reversed instead. Furthermore, as illustrated in FIG. 8B, the projection members 231 may be configured by arranging the same polarity on the front and back sides instead.

The inner ring unit 210a of the present embodiment has a wheel unit 212 in the form of a disk as a base component with a center hole 211 in the center position of this wheel unit 212. The wheel unit 212 is fixed to the axle 21 which is inserted through the center hole 211 and rotatable integrally with the axle 21. More specifically, an indent section 252 is formed on the outer surface of the wheel unit 212 in the same profile as the stopper member 250, which is threaded on the axle 21 and fitted to the indent section 252 so that the wheel unit 212 and the stopper member 250 are integrally joined to transmit the rotation force of the axle 21 to the wheel unit 212. Then, when the wheel unit 212 rotates around the axle 21 in association with the rotation of the rear wheel 13, the inner ring unit 210a move the magnetic members 213 arranged on the outer surface thereof in relation to the outer ring unit 210b.

On the other hand, the outer ring unit 210b is provided with a housing section 218 in a bottomed cylindrical shape having a center hole 217 in the center position of its bottom portion through which the axle 21 is inserted in order that the outer ring unit 210b is separated from the rotation of the rear wheel 13. More specifically, the housing section 218 of the outer ring unit 210b is fixed to the main body of a bicycle through frame members 214 and 214 which are fixed to the rear end 9 of the bicycle and connected to the opposite sides of the housing section 218 in order that the axle 21 rotates in an idling condition as seen from the center hole 217 in order not to transmit the rotation of the rear wheel 13. On the other hand, the outer ring unit 210b has a hollow space with an outer opening to house the inner ring unit 210a, a number of the magnetic members 215 which are annularly arranged in the inner surface of the housing section 218, and a number of shield apertures 216 which are annularly arranged along the perimeter of the bottom surface of the housing section 218 in correspondence with the arrangement of the magnetic members 215 respectively. The housing section 218 is fixed to the body frame of the bicycle by the frame members 214.

The magnet drive unit of the present embodiment consists of the axle 21 and the stopper member 250, and functions as a driving mechanism which changes the distance between the pair of magnetic members 213 and 215 in predetermined cycles by the rotation of the rear wheel 13. More specifically, the wheel unit 212 is rotated by the stopper member 250 which rotates integrally with the axle 21 of the rear wheel 13. The wheel unit 212 as a rotary member is a cylindrical member which is connected to the axle 21 and axially supports the inner ring unit 210a as discussed above. Then, when the wheel unit 212 rotates by the rotation of the rear wheel 13, the inner ring unit 210a rotates in relation to the outer ring unit 210b. Incidentally, the housing section 218 and the wheel unit 212 are spacially located close to each other, but mechanically separated from each other by a bearing or the like sliding mechanism (not shown in the figure) so that the rotation force of the wheel unit 212 is not transmitted to the housing section 218.

The shield unit 230 has a structure with a fixed arrangement of projection members 231 between the outer surface of the inner ring unit 210a and the inner surface of the outer ring unit 210b, and has a facing arrangement at a position with a distance that is shorter than the minimum separation distance (FIG. 12B) between the pair of magnetic members 213 and 215 in the plurality of variable magnetic units arranged consecutively. More specifically, a plurality of projection members 231 that are arranged in a circular shape protrudes into the outer ring unit 210b through the shield apertures 216 and are fixed, if the position between the adjacent magnetic members 215, 215 is assumed as the angle 2θ with the center of rotation O as the center, the projection members 231 are fixed at a position of the intermediate angle θ. Also, magnetic surfaces 234 are arranged on the front and back sides of these projection members 231, and these magnetic surfaces 234 have different polarities arranged as shown in FIG. 12B.

(Operation of Rotation Assistance Mechanism)

The operation of the rotation assistance mechanism 200 having the configuration as described above will be explained in the following description.

First, the rear wheel 13 of the bicycle 10 is rotated by turning the pedal 18 of the bicycle 10. The rotation of this rear wheel 13 is transmitted to the variable magnetic unit 210. When the rear wheel 13 rotates, the wheel unit 212 of the variable magnetic unit 210 connected to the axle 21 of the rear wheel 13 also rotates around the axle 21. This wheel unit 212 is fixed to the axle 21 with the stopper member 250 such as a nut, and rotates to move the magnetic members 213 arranged on the peripheral surface in relation to the outer ring unit 210b.

In this case, the housing section 218 of the outer ring unit 210b and the wheel unit 212 of the inner ring unit 210a are mechanically separated from each other so that the rotation force of the wheel unit 212 is not transmitted to the housing section 218. Meanwhile, in the present embodiment, the projection members 231 are fixed to the bottom face of the outer ring unit 210b, and the magnetic members 213 are moved in relation to the projection members 231 of the projection members 231 by the rotation of the inner ring unit 210a. The intensity of the repulsive force on the magnetic members 213 by magnetic members 215 and projection members 231 is continuously changed by the movement of the magnetic members 213 in relation to the projection members 231.

(Actions/Effects)

In accordance with the present invention as described above, the shield unit has a facing arrangement at the position with a distance that is shorter than the minimum separation distance between a pair of magnetic members in between the plurality of variable magnetic units arranged consecutively, and since the shield unit moves toward and away from between the pair of magnetic members in predetermined cycles when the distance between the pair of magnetic members is contracted, it is possible to continuously change the intensity of repulsive force and attraction force by the magnetic members, and strength or weakness can be imparted to the rotation of the rotation axis. In this case, since the variable magnetic unit has adjacent magnetic members 215, 215 arranged consecutively to have the same polarity and the magnetic surfaces 234 of the shield unit 230 will always have the same polarity as those of the corresponding opposite surfaces of the magnetic members 213 respectively, there is no locking of the rotation mechanism by the attachment of the opposite poles.

(Modification Examples)

(1) Modification Example 1

Incidentally, the description of the embodiment described above is an example of the present invention. The present invention is not limited to the embodiments described above, as long as it does not deviate from the technical idea of the present invention, various modifications are possible based on the design.

For example, as illustrated in FIG. 13A, in the embodiment described above, the projection members 231 can be arranged at an inclination with a predetermined angle to the tangential direction of the rotation circle of the inner ring unit 210a. In this case, the magnetic field of the magnetic surfaces 234 can be tilted in the rotation direction by tilting the magnetic surfaces 234 arranged on the front and back sides of the projection members 231 with respect to the rotation circle, and it is possible to continuously generate magnetic force intensity effective for rotation. Meanwhile, in the illustrated example, the magnetic surfaces have different magnetic polarities on the front and back sides of the projection members 231, as illustrated in FIG. 8B, the projection members 231 may be configured by arranging the same polarity on the front and back sides instead.

(3) Modification Example 2

Figure 13B:
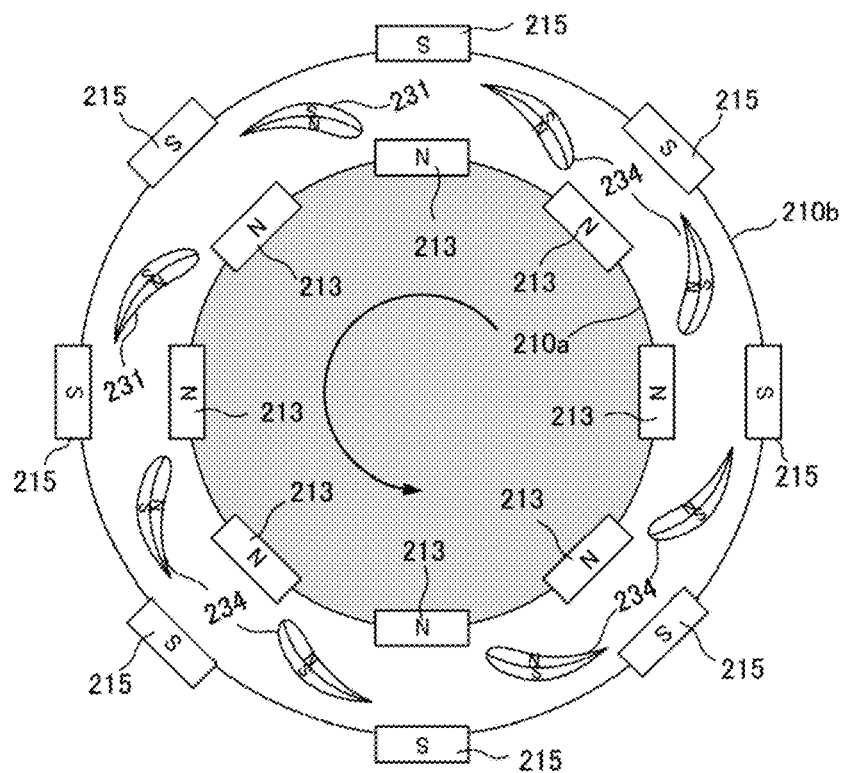

Furthermore, as illustrated in FIG. 13B, the horizontal cross-sectional shape of the projection members 231 can be formed into projection members 231 with a curved and streamlined arcuate wing shape instead. In this case, in the same way as modification example 2 described above, the projection members 231 are arranged at an inclination with a predetermined angle to the tangential direction of the rotation circle of the inner ring unit 210a. In the projection members 231 with arcuate wing shape, curvature of the surface directed towards the outer ring unit 210b and curvature of the surface directed towards the inner ring unit 210a are different, and areas of the respective curved surfaces are different. In this way, since the resultant force of repulsive force exerted by each of the inner and outer magnetic members 215 and 213 is directed in the tangential direction of the rotating circle by forming the shield unit 230 into a curved and streamlined arcuate wing shape and inclining with a predetermined angle to the tangential direction of the rotation circle, it is possible to continuously generate a magnetic force intensity effective for rotation. Meanwhile, in the illustrated example, the magnetic surfaces have different magnetic polarities on the front and back sides of the projection members 231, as illustrated in FIG. 8B, the projection members 231 may be configured by arranging the same polarity on the front and back sides instead.

Third Embodiment

Figure 14:
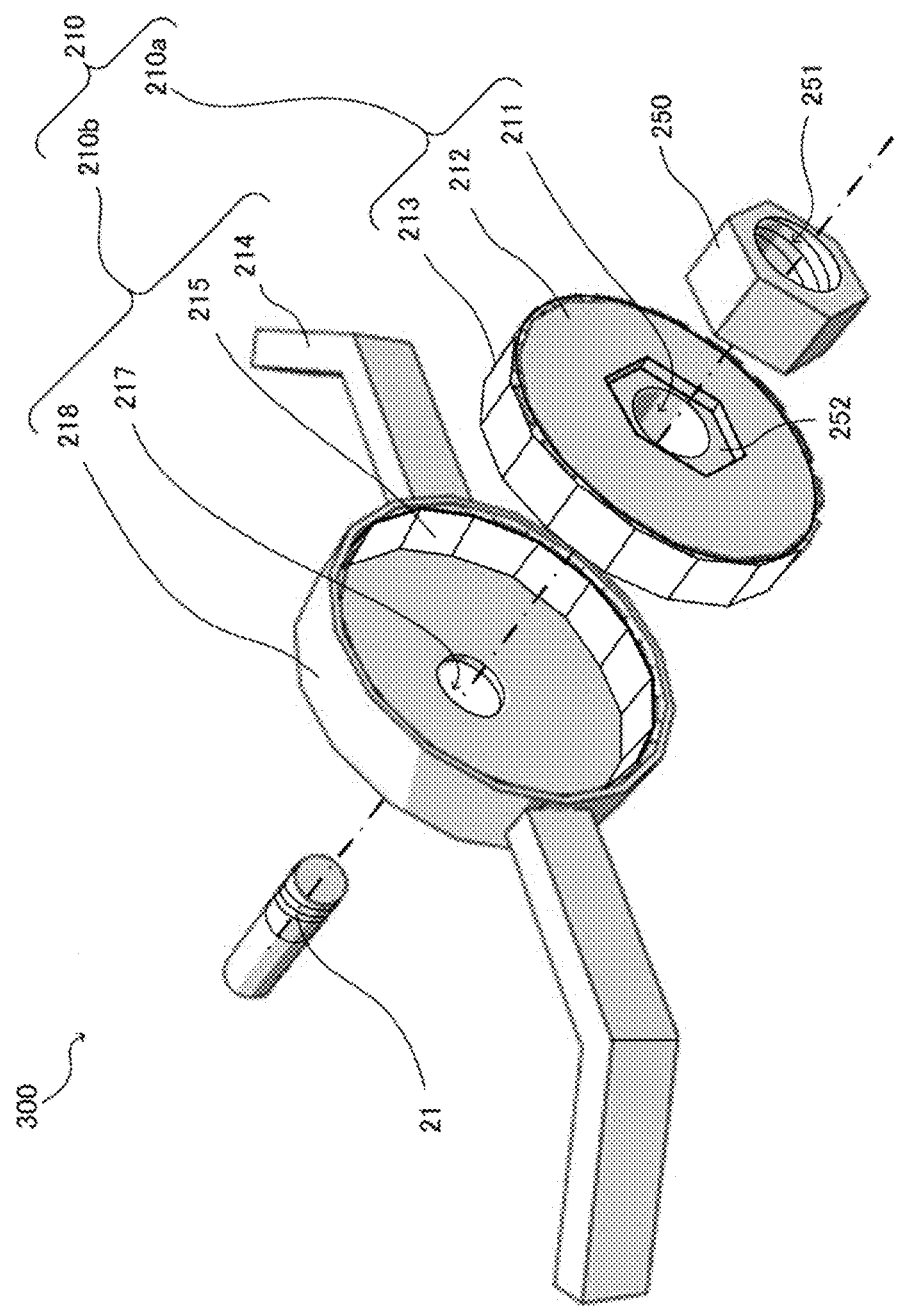
FIG. 14 is a perspective view for showing the structure of the rotation assistance mechanism in accordance with the third embodiment.
Figure 15:
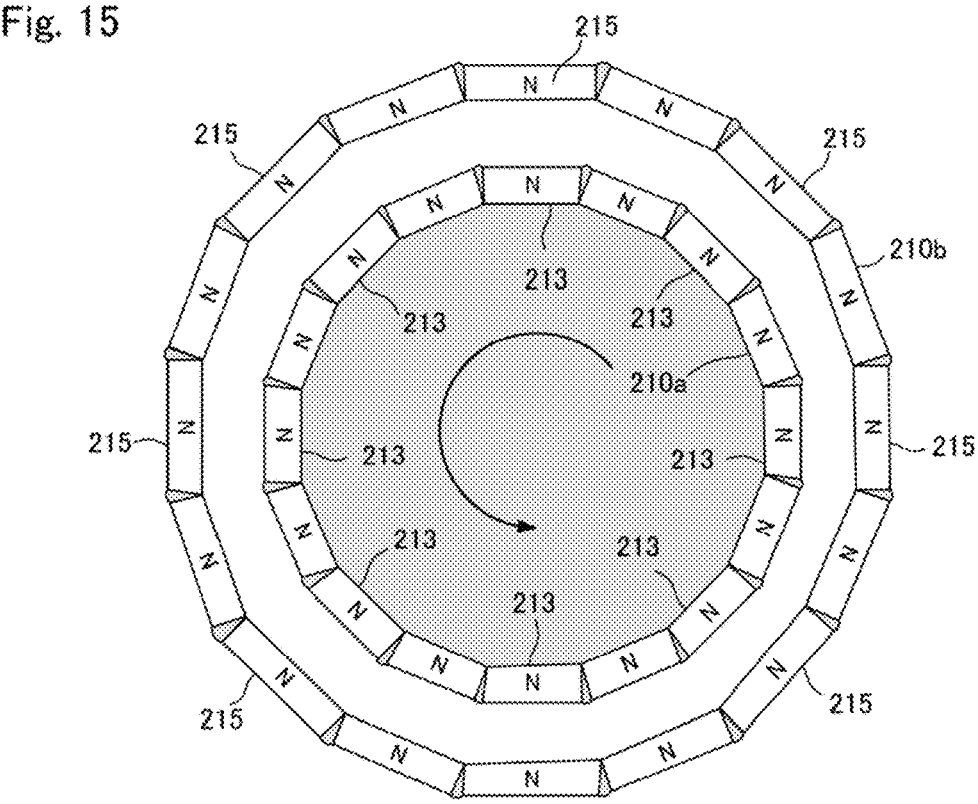
FIG. 15 shows views for explaining the positional relationship of the magnetic members facing each other in accordance with the third embodiment.

Next, a third embodiment of the present invention will be explained. The first and second embodiments as described above is provided with a shield unit with magnetic surfaces between the pair of magnetic members 213 and 215, the gist of the present embodiment is that the shield unit has been omitted in this configuration. FIG. 14 is a perspective view of the rotation assistance mechanism of the present embodiment. FIG. 15 is an explanatory view to schematically show the operations. Meanwhile, in the description of the present embodiment, like reference numbers indicate functionally similar elements as the above embodiment unless otherwise specified, and therefore no redundant description is repeated.

(Rotation Assistance Mechanism)

The configuration of the rotation assistance mechanism will be explained in accordance with the present embodiment. In the case of the present embodiment, the rotation assistance mechanism 300 is a mechanism for imparting intensity to the rotation of the axle 21 and rear wheel 13, and provided with the variable magnetic unit 210 for imparting intensity to the rotation force to the rear wheel 13 through the axle 21 by the use of the attracting force or repulsion force of a magnet, a magnet drive unit consisting of the axle 21 and a stopper member 250 for driving the variable magnetic unit 210, a shield unit 230 for imparting intensity to the attracting force of the variable magnetic unit 210. The gist of the present embodiment resides in the arrangement of a cylindrical inner ring and an outer ring on a concentric axis, and arrangement of a number of magnetic members on the side faces of each cylinder as the variable magnetic unit 210 to generate a suction force and a repulsion force by the magnetic members. The power source of the magnet drive unit is the axle 21 which is the rotation axis of the rear wheel 13. The rotation force of the axle 21 is transmitted to an inner ring unit 210a which is the magnetic drive unit through the stopper member 250.

The variable magnetic unit 210 as shown in FIG. 15 is a drive unit having magnetic members 213 and 215 which are all paired with same polarities facing each other. In the case of the present embodiment, the variable magnetic unit 210 includes the inner ring unit 210a in the form of a cylinder provided with a plurality of magnetic members 213 on its outer surface and the outer ring unit 210b in the form of a cylinder which is fitted inside the inner ring unit 210a and provided with a plurality of magnetic members 215 on its inner surface. The inner ring unit 210a and the outer ring unit 210b has a plurality of variable magnetic members arranged consecutively such that the adjacent magnetic members are of the same polarity. That is, the N poles are arranged by directing outward on the outer surface of the inner ring unit 210a such that adjacent magnetic members 213 and 213 are of the same polarity. Also, they are arranged consecutively such that adjacent magnetic members 215, 215 are of the same polarity even on the inner surface of the outer ring unit 210b.

Particularly, the pair of magnetic members 213 and 215 in the variable magnetic unit 210 are formed such that the area of the magnetic members 215 on one side is greater than the magnetic members 213 on the other side and are arranged such that the adjacent magnetic members 213 or 215 are arranged in contact with each other. Meanwhile, in the illustrated example, although all of the magnetic members 213 and 215 have been made N pole, all the magnetic members may be made S-pole instead.

(Actions/Effects)

In accordance with the invention as described above, since a pair of magnetic members 213 and 215 which are located with opposite poles facing each other is consecutively arranged such that the adjacent magnetic members 213 or 215 are also of the same polarity, the distance between the pair of magnetic members is widened and narrowed periodically, it is possible to continuously generate the attractive force and the repulsive force by the magnetic members, and intensity can be imparted to the rotation of the rotation axis.

(Modification Examples)

Incidentally, the description of the third embodiment described above is an example of the present invention. The present invention is not limited to the embodiments described above, as long as it does not deviate from the technical idea of the present invention, various modifications are possible based on the design.

Figure 16:
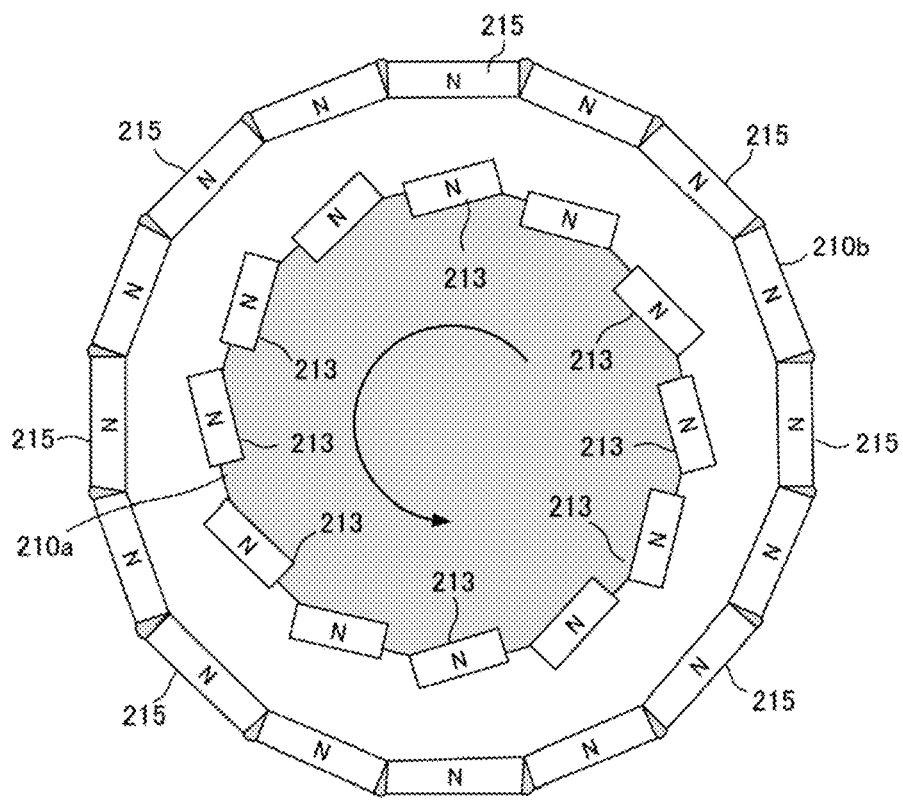
FIG. 16 shows views for explaining the positional relationship of the magnetic members in accordance with the modification examples of the third embodiment.

For example, as illustrated in FIG. 16, in the embodiment described above, the magnetic members 213 on the inner ring unit 210a side can be arranged at an inclination with a predetermined angle to the tangential direction of the rotation circle of the inner ring unit 210a. In this case, the magnetic field of the magnetic members 213 can be tilted in the rotation direction by tilting the magnetic members 213 with respect to the rotation circle, and it is possible to continuously generate magnetic force intensity effective for rotation. Further, in the same figure, though the magnetic members 213 in the inner ring unit 210a have been arranged by tilting, the magnetic members 215 in the outer ring unit 210b can be tilted at a predetermined angle with respect to the tangential direction of the rotation circle instead.

Figure 17A:
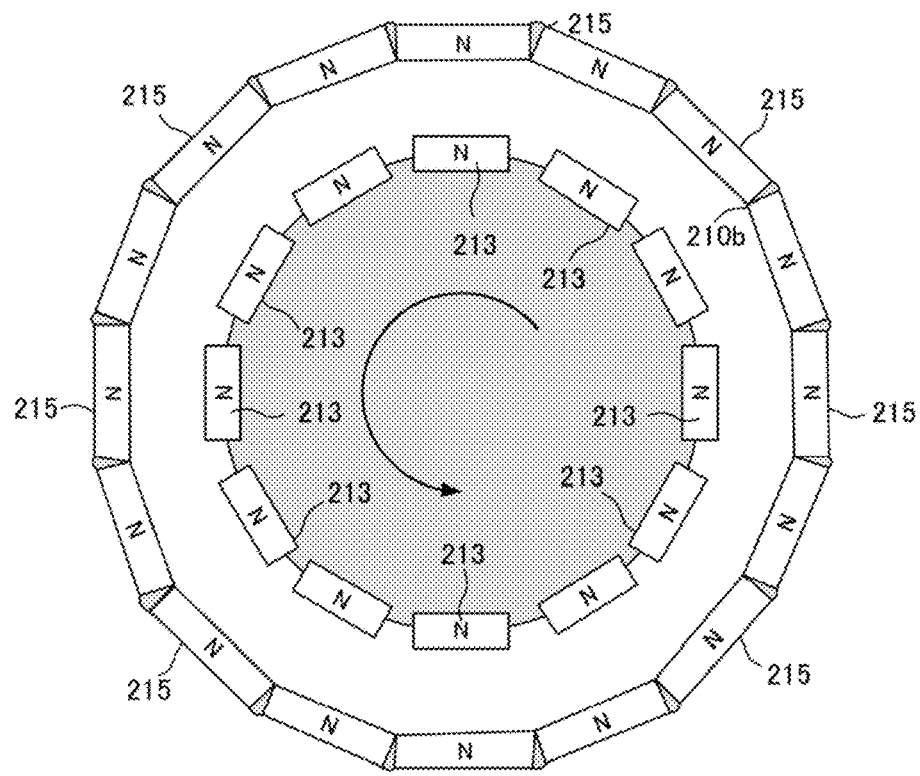
FIGS. 17A and 17B show views for explaining the positional relationship of the magnetic members in accordance with the modification examples of the third embodiment.
Figure 17B:
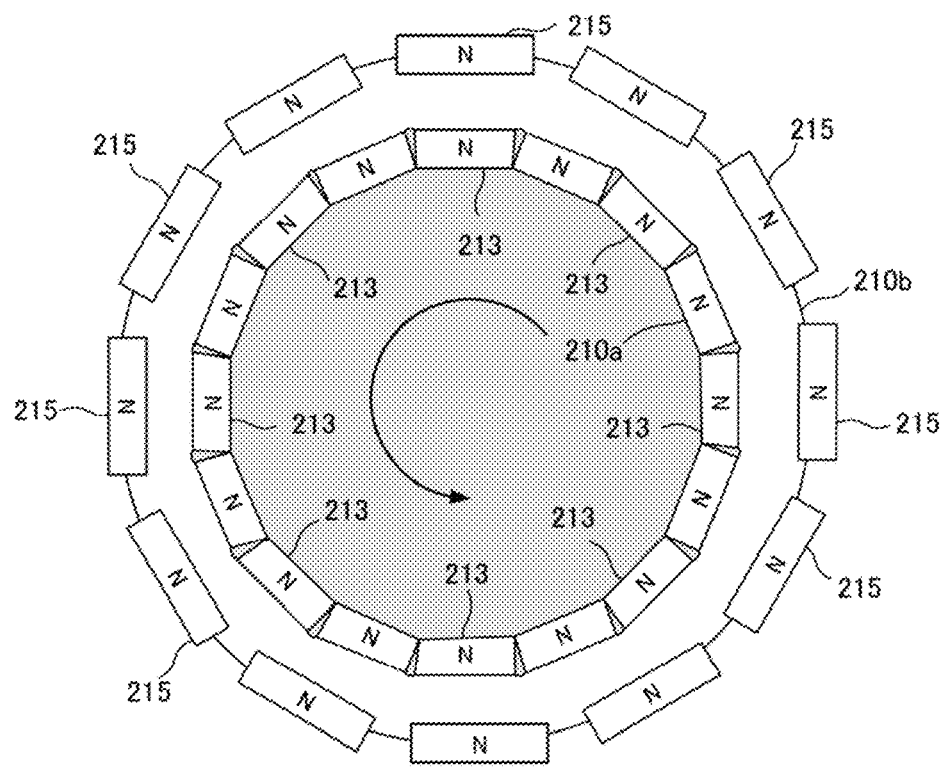

Furthermore, in the above third embodiment, the adjacent magnetic members 213 or adjacent magnetic members 215 are arranged such that they are in close contact, but for example, as illustrated in FIGS. 17A and 17B, the adjacent magnetic members 213 and 213 in the inner ring unit 210a or the adjacent magnetic members 215 and 215 in the outer ring unit 210b can be arranged leaving a gap between them instead. Even in this case, the magnetic members 213 and 215 in the variable magnetic unit 210 are formed such that the area of the magnetic members 215 on one side is greater than the magnetic members 213 on the other side.

DESCRIPTION OF REFERENCE SIGNS

1 . . . body frame
2 . . . head tube
3 . . . down tube
4 . . . rear fork
5 . . . seat post
6 . . . front fork
7 . . . front wheel
8 . . . handlebar
9 . . . rear end
10 . . . bicycle
11 . . . chain
12 . . . stay
13 . . . rear wheel
14 . . . crank shaft
15 . . . seat
16 . . . support shaft
17 . . . crank
18 . . . pedal
19 . . . driving sprocket
20 . . . non-driven sprocket
21 . . . axle
22 . . . hub
100, 200, 300 . . . rotation assistance mechanism
210 . . . variable magnetic unit
210a . . . inner ring unit
210b . . . outer ring unit
211 . . . center hole
212 . . . wheel unit
213, 215 . . . magnetic member
214 . . . frame member
215 . . . magnetic member
216 . . . shield aperture
218 . . . housing section
220 . . . magnet drive unit
230 . . . shield unit
231 . . . projection member
217, 232 . . . center hole
233 . . . base
234 . . . magnetic surface
240 . . . shield drive unit
240a . . . flange
241 . . . coupling pin
242 . . . rotary member
243 . . . guide groove
250 . . . stopper member
252 . . . indent section

What is claimed is:

1. A rotation assistance mechanism for imparting intensity to the rotation of a rotation axis, comprising:
   a plurality of variable magnetic units that has a consecutive arrangement of a pair of magnetic members which are located with opposite poles facing each other;
   a magnet drive unit configured to change the distance between the pair of magnetic members in predetermined cycles by the rotation of the rotation axis; and
   a shield unit provided to be advanced to and retracted from between the pair of magnetic members facing each other;
   a shield drive unit configured to advance the shield unit to between the pair of magnetic members in predetermined cycles when the distance between the pair of magnetic members is contracted, and retract the shield unit from between the pair of magnetic members in the predetermined cycles when the distance between the pair of magnetic members is expanded; and
   wherein the variable magnetic unit comprising:
   an inner ring unit in the form of a cylinder which rotates together with the rotation of the rotation axis and provided with a plurality of one of the pair of magnetic members arranged consecutively on its outer surface; and an outer ring unit in the form of a cylinder which is separated from the rotation of the rotating shaft and fitted on the outside of the inner ring and provided with a plurality of the other member of the pair of magnetic members arranged consecutively of its inner surface; wherein the magnetic members directed outward on the outer surface of the inner ring unit are of the same polarity, the magnetic members directed inwards on the inner surface of the outer ring unit are of the same polarity, the shield unit has a first magnetic surface facing the inner ring unit and having a magnetic polarity that is the same to that of the outer surface of the inner ring unit and a second magnetic surface facing the outer ring unit and having a magnetic polarity that is the same to that of the inner surface of the outer ring unit, the first magnetic surface and the second magnetic surface are arranged at an inclination with a predetermined angle to the tangential direction of the rotation circle of the inner ring so that a repulsive magnetic force is generated between the inner ring unit and the first magnetic surface and between the outer ring unit and the second magnetic surface, the first magnetic surface and the second magnetic surface are formed into a curved and streamlined arcuate wing shape in the horizontal cross-sectional shape so that the first magnetic surface and the second magnetic surface face are opposite to each other in a radial direction, a curvature of the first magnetic surface is different from that of the second magnetic surface, and an area of the first magnetic surface is different from that of the second magnetic surface.

2. The rotation assistance mechanisms recited in claim 1, wherein the variable magnetic unit comprising:

an inner ring unit in the form of a cylinder which rotates together with the rotation of the rotation axis and provided with a plurality of one of the pair of magnetic members arranged consecutively on its outer surface; and an outer ring unit in the form of a cylinder which is separated from the rotation of the rotating shaft and fitted on the outside of the inner ring and provided with a plurality of the other member of the pair of magnetic members arranged consecutively of its inner surface;

wherein the magnet drive unit includes a rotary member which rotates together with the rotation axis so that the inner ring unit is rotated in relation to the outer ring unit by the rotation of the rotation axis;

wherein the shield unit is provided with a plurality of projection members having the magnetic surfaces in the front and back sides thereof, and moves the projection members forward and backward between the outer surface of the inner ring unit and the inner surface of the outer ring unit, wherein the shield drive unit includes a cylindrical groove cam which converts the rotation force of the rotary member to the forward and backward motion of the projection member, and wherein the shield drive unit advances the magnetic surfaces of the projection members between the magnetic members of the inner ring unit and the magnetic members of the outer ring unit in predetermined cycles with the timing when the magnetic members of the outer ring unit come close to the magnetic members of the inner ring unit with opposite polarities respectively and retracts the magnetic surfaces of the projection members from between the magnetic members of the inner ring unit and the magnetic members of the outer ring unit in the predetermined cycles with the timing when the magnetic members of the outer ring unit come close to the magnetic members of the inner ring unit with the same polarities respectively.

3. A rotation assistance mechanism for imparting intensity to the rotation of a rotation axis, comprising:

a plurality of variable magnetic units that has a consecutive arrangement of a pair of magnetic members which are located with same poles facing each other;

a magnet drive unit configured to change the distance between the pair of magnetic members in predetermined cycles by the rotation of the rotation axis; and a shield unit provided to be advanced to and retracted from between the pair of magnetic members facing each other;

a shield drive unit configured to advance the shield unit to between the pair of magnetic members in predetermined cycles when the distance between the pair of magnetic members is contracted, and retract the shield unit from between the pair of magnetic members in the predetermined cycles when the distance between the pair of magnetic members is expanded; wherein the magnetic members directed outward on the outer surface of the inner ring unit are of the same polarity, the magnetic members directed inwards on the inner surface of the outer ring unit are of the same polarity, the variable magnetic unit comprising:

an inner ring unit in the form of a cylinder which rotates together with the rotation of the rotation axis and provided with a plurality of one of the pair of magnetic members arranged consecutively on its outer surface; and an outer ring unit in the form of a cylinder which is separated from the rotation of the rotating shaft and fitted on the outside of the inner ring and provided with a plurality of the other member of the pair of magnetic members arranged consecutively of its inner surface; and wherein the shield unit has a first magnetic surface facing the inner ring unit and having a magnetic polarity that is the same to that of the outer surface of the inner ring unit and a second magnetic surface facing the outer ring unit and having a magnetic polarity that is the same to that of the inner surface of the outer ring unit, the first magnetic surface and the second magnetic surface are arranged at an inclination with a predetermined angle to the tangential direction of the rotation circle of the inner ring, the first magnetic surface and the second magnetic surface are formed into a curved and streamlined arcuate wing shape in the horizontal cross-sectional shape so that the first magnetic surface and the second magnetic surface face are opposite to each other in a radial direction, a curvature of the first magnetic surface is different from that of the second magnetic surface, and an area of the first magnetic surface is different from that of the second magnetic surface.

4. A rotation assistance mechanism for imparting intensity to the rotation of a rotation axis, comprising:

a variable magnetic unit that has a consecutive arrangement of a pair of magnetic members which are located with same poles facing each other, a magnet drive unit configured to change the distance between the pair of magnetic members in predetermined cycles by the rotation of the rotation axis; and
a shield unit that has a facing arrangement at a position that is shorter than the shortest distance of the distance between a pair of magnetic members in between the plurality of variable magnetic units arranged consecutively,
wherein
the magnetic members directed outward on the outer surface of the inner ring unit are of the same polarity,
the magnetic members directed inwards on the inner surface of the outer ring unit are of the same polarity,
the variable magnetic unit comprising:
an inner ring unit in the form of a cylinder which rotates together with the rotation of the rotation axis and provided with a plurality of one of the pair of magnetic members arranged consecutively on its outer surface; and
an outer ring unit in the form of a cylinder which is separated from the rotation of the rotating shaft and fitted on the outside of the inner ring and provided with a plurality of the other member of the pair of magnetic members arranged consecutively of its inner surface; and wherein the shield unit has a first magnetic surface facing the inner ring unit and having a magnetic polarity that is the same to that of the outer surface of the inner ring unit and a second magnetic surface facing the outer ring unit and having a magnetic polarity that is the same to that of the inner surface of the outer ring unit and is retracted from between the pair of magnetic members in predetermined cycles when the distance between the pair of magnetic members is contracted and advanced to between the pair of magnetic members in predetermined cycles when the distance between the pair of magnetic members is expanded,
the first magnetic surface and the second magnetic surface are arranged at an inclination with a predetermined angle to the tangential direction of the rotation circle of the inner ring,
the first magnetic surface and the second magnetic surface are formed into a curved and streamlined arcuate wing shape in the horizontal cross-sectional shape so that the first magnetic surface and the second magnetic surface face are opposite to each other in a radial direction,
a curvature of the first magnetic surface is different from that of the second magnetic surface, and
an area of the first magnetic surface is different from that of the second magnetic surface.

\* \* \* \* \*